United States Patent [19]

Morley et al.

[11] Patent Number: 5,418,952
[45] Date of Patent: * May 23, 1995

[54] PARALLEL PROCESSOR CELL COMPUTER SYSTEM

[75] Inventors: Richard E. Morley, Mason; Douglas H. Currie, Jr., Londonderry; Gabor L. Szakacs, Nashua, all of N.H.

[73] Assignee: Flavors Technology Inc., Amherst, N.H.

[ * ] Notice: The portion of the term of this patent subsequent to Aug. 4, 2009 has been disclaimed.

[21] Appl. No.: 897,361

[22] Filed: Jun. 11, 1992

Related U.S. Application Data

[63] Continuation of Ser. No. 276,413, Nov. 23, 1988, Pat. No. 5,136,717.

[51] Int. Cl.$^6$ .................... G06F 13/362; G06F 15/16
[52] U.S. Cl. .................... 395/650; 395/200; 395/375; 395/550; 395/725; 395/800; 364/DIG. 1; 364/229; 364/229.2; 364/230.1; 364/230.3; 364/231.9; 364/232.1; 364/280.7; 364/281.3; 364/281.4
[58] Field of Search ............ 364/DIG. 1, DIG. 2; 395/200, 275, 375, 425, 550, 650, 725, 800

[56] References Cited

U.S. PATENT DOCUMENTS

| | | | |
|---|---|---|---|
| 4,164,787 | 8/1979 | Aranguren | 364/200 |
| 4,347,601 | 8/1982 | Schmidt | 370/58 |
| 4,414,624 | 11/1983 | Summer, Jr. et al. | 395/800 |
| 4,504,906 | 3/1985 | Itaya et al. | 364/200 |
| 4,558,411 | 12/1985 | Faber et al. | 364/200 |
| 4,574,348 | 3/1986 | Scallon | 364/200 |
| 4,591,981 | 5/1986 | Kassabov | 364/200 |
| 4,698,751 | 10/1987 | Parvin | 364/200 |
| 4,727,473 | 2/1988 | Anderson et al. | 364/188 |
| 4,727,503 | 2/1988 | McWhirter | 364/715 |
| 4,752,889 | 6/1988 | Rappaport et al. | 364/513 |
| 4,783,738 | 11/1988 | Li et al. | 364/200 |
| 4,827,403 | 5/1989 | Steele, Jr. et al. | 364/200 |
| 4,873,623 | 10/1989 | Lane et al. | 364/188 |
| 4,888,683 | 12/1989 | Koizumi et al. | 364/200 |
| 4,891,787 | 1/1990 | Gifford | 364/900 |
| 4,922,413 | 5/1990 | Stoughton et al. | 364/200 |
| 4,933,836 | 6/1990 | Tulpule et al. | 364/200 |
| 4,937,777 | 6/1990 | Flood et al. | 364/900 |
| 4,949,243 | 8/1990 | Mohamed Ali et al. | 364/200 |
| 5,055,999 | 10/1991 | Frank et al. | 364/200 |
| 5,136,717 | 8/1992 | Morley et al. | 395/800 |

OTHER PUBLICATIONS

Fortes et al, "Systolic Arrays—From Concept to Implementation", IEEE, 1988 pp. 12–17.
S. Kauffman, "Antichaos and Adaptation"; *Scientific American*, Aug., 1991, pp. 78–84.
"The Power to Control Your Entire Factory or Process", 4-page brochure from Flavors Technology Inc., 1989.

(List continued on next page.)

*Primary Examiner*—Thomas G. Black
*Assistant Examiner*—John C. Loomis
*Attorney, Agent, or Firm*—Weingarten, Schurgin, Gagnebin & Hayes

[57] ABSTRACT

A computer system especially for solution of real time inference problems is disclosed. The system includes a systolic cellular processor which provides predictable and responsive real time operation and fine grain programmability. The system comprises a plurality of separate processor cells each having its own local memory, the cells running simultaneously and operative to execute their respective program instructions. A global memory is coupled via a global bus to the processor cells and provides data to the cells and stores data from the cells. The bus provides effectively simultaneous access of all cells to the global memory. A further feature of the system is a novel parallel programming language using English syntax and which provides synchronous and predictable binding of code to each cell. A graphic work station is provided as a user interface to provide visual access to each cell or to cell groups for ease of control. The system can also function to emulate large scale integrated circuit processors by reason of the fine grain programmed operation of the system.

12 Claims, 13 Drawing Sheets

OTHER PUBLICATIONS

R. Morely, "Chaos—The Edge of Understanding", May, 1990, pp. 1–18.

C. Schelberg, "Fast Intelligent Systems and Their Applications", *Proceedings of the EDS Int'l. Prog. controls Conference and Exposition*, Apr. 9–11, 1991, pp. 1–25.

T. Lynch, "Zen and the Art of Automation", *Design News*, Sep. 23, 1991, pp. 1–3.

G. Vasilash, "Talking the Talk & Walking the Walk into the Future", *Production*, Dec., 1991, pp. 34–37.

R. Morley, "The 'Chicken Brain' Approach to Agile Manufacturing", *ESD Technology*, Mar., 1992, pp. 13–17.

S. Forrest, "Emergent Computation", *Physica* D 42, 1990, pp. 1–7.

A. Choi, "User Interface Design Issues In a Real-Time Parallel System For Industrial Controls", *Proceedings of the EDS Int'l. Prog. Controls Conference and Exposition*, Apr. 6–9, 1992, pp. 159–169.

G. Ekbert, "Utilization of a Multiprocessor Control Platform and Chaotic Programming Methodologies For Real Time Process Control", *Proc. of the EDS Int'l. Prog. Controls Conference and Exposition*, Apr. 9–11, 1991, p. 1–7.

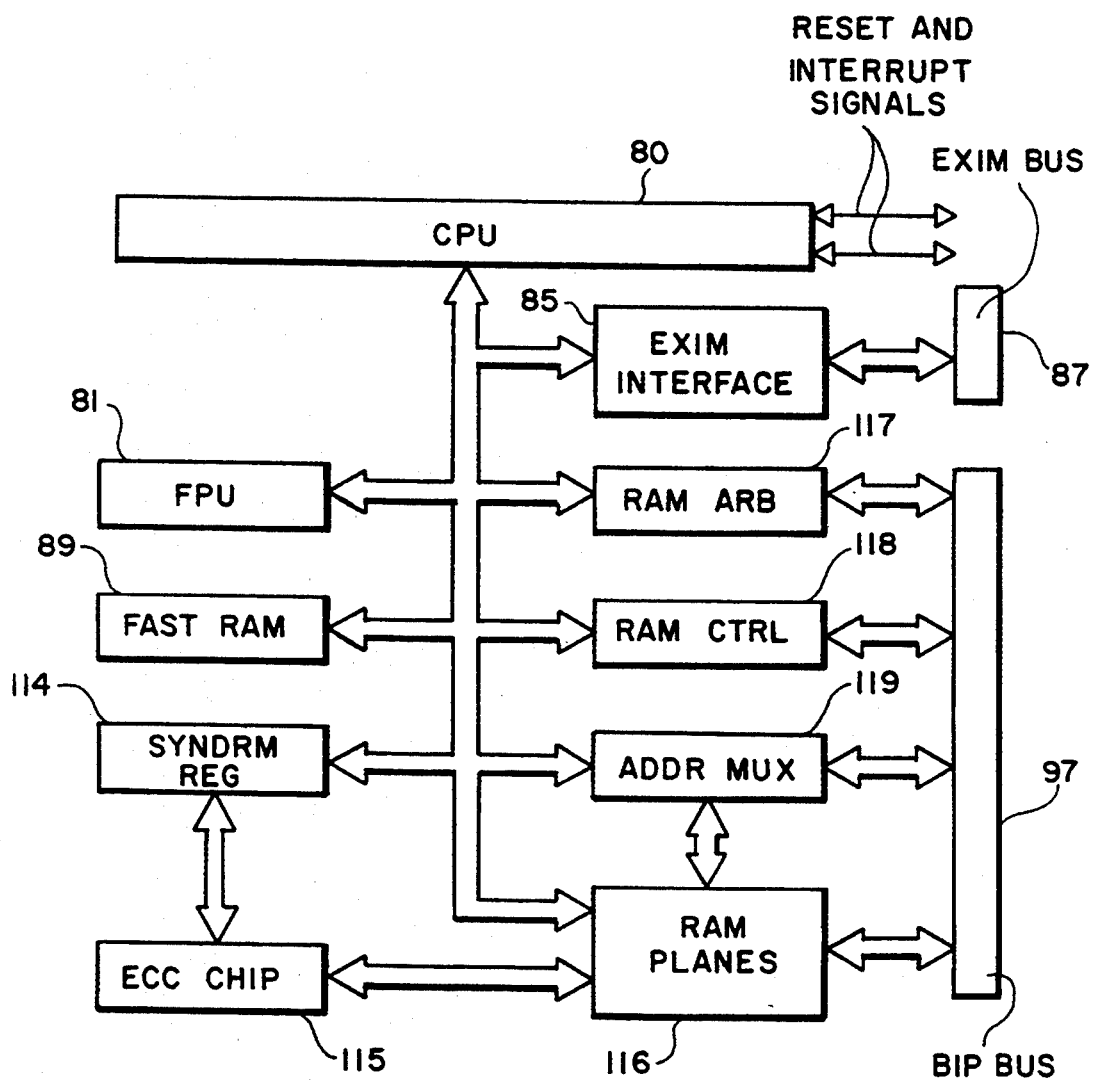
_Fig 4_

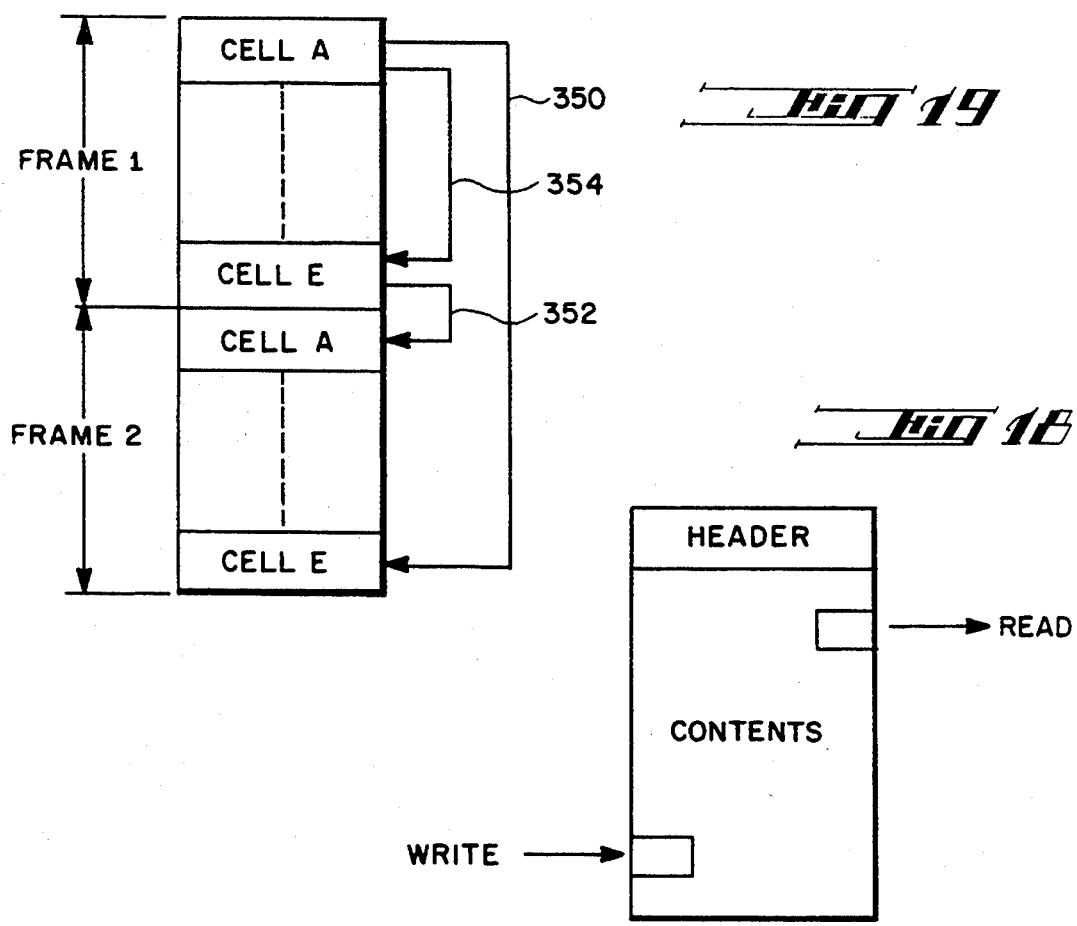
Fig. 19
Fig. 18
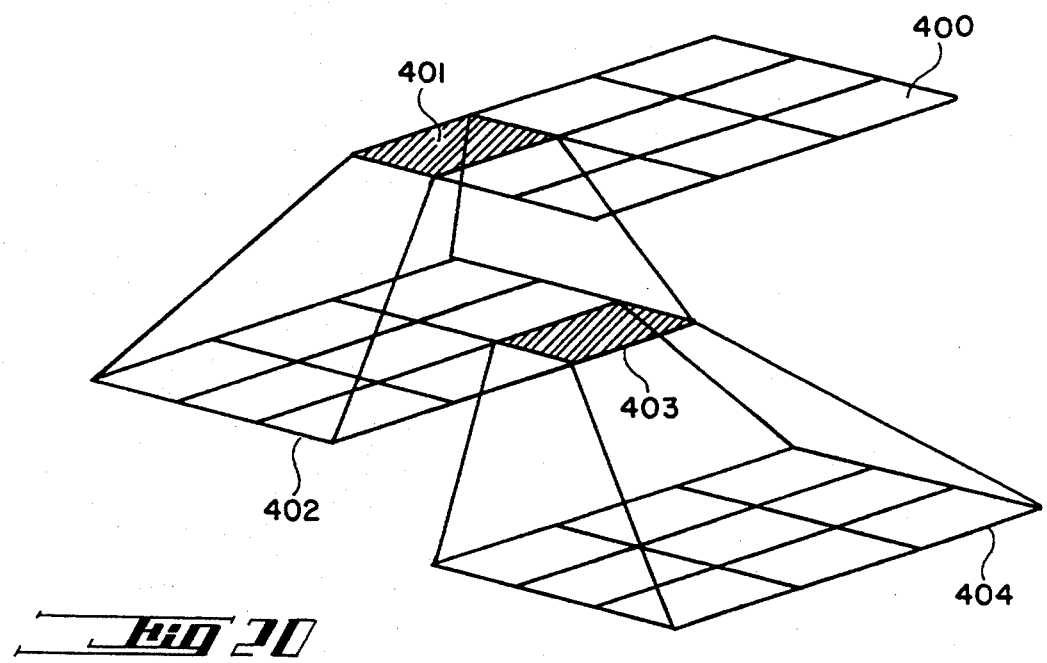
Fig. 20

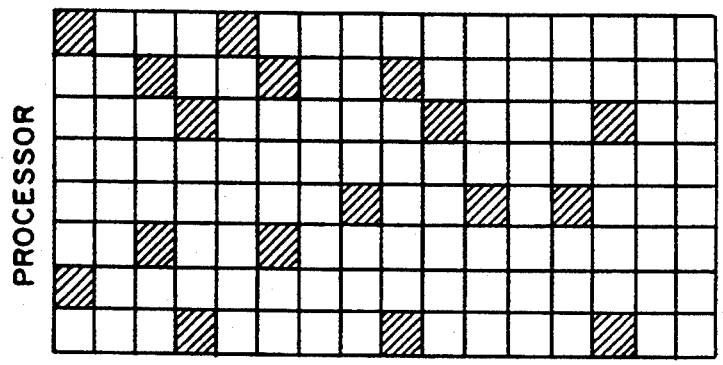

CELLS / PROCESSOR

Fig. 23

```
500        502          504
  1  [FRED]      SET A=2
  2  [RUNNING] IF TEMP>50 THEN SET SHUTDOWN=1 & SET RUNNING=0
  3  ////////////////////////////////////////////////////////
  4  [A=2]       SET A=3
  5  ////////////////////////////////////////////////////////
  6  [A TURNS ON] SET A=2
  7               SET B=3
  8  ////////////////////////////////////////////////////////
  9  [NOT FRED]  SET A=0
 10  ////////////////////////////////////////////////////////
508
506
```

Fig. 24

PARALLEL PROCESSOR CELL COMPUTER SYSTEM

This application is a continuation of application Ser. No. 07/276,413, filed Nov. 23, 1988, now U.S. Pat. No. 5,136,717.

FIELD OF THE INVENTION

This invention relates to computer systems, and more particularly to parallel processor systems for high speed real time operation.

BACKGROUND OF THE INVENTION

Parallelism is the preferable way to increase computer processing speed. One early form of parallelism was the Single-Instruction Multiple-Data (SIMD) architecture, in which the same program is applied to separate sets of data at the same time. SIMD architecture generally has a fast throughput because once an instruction has been read from memory, it can be applied to several sets of different data, and the computer can spread over more calculations the cost of reading the instruction from memory. SIMD computing has limited applicability however, because it requires that each of the different sets of data be processed in the same way. While this may not be a concern where a single algorithm can be applied to different data representing different parts of a problem, most problems cannot be solved effectively with SIMD architecture.

Another design, known as the "Harvard architecture," provides one memory for instructions and a separate memory for data. Each of the memories has its own data path to the CPU, allowing the CPU to obtain twice as much information per unit of time. The extra paths, however, greatly increase the number of connections in the computer, and thus correspondingly increase its cost. Moreover, the design presumes a fixed ratio between data size and program size, thus limiting the computer's use when either the program or the data grow too large to fit into its dedicated memory.

Another way to achieve the effects of parallelism is by means of pipelining, where a process is divided into separate phases, and separate hardware is provided for each phase of the operation. As each phase completes its work, the problem is passed on to different hardware which performs the next operation. Thus, instead of data being held in one set of hardware registers throughout an operation, as in a conventional system, the data is passed through many sets of registers, each dedicated to a different function. A pipeline processor can run very fast as long as information is available in a steady stream, but it may have latency and data flushing problems at the beginning and end of each problem.

Most parallel processor computers available today use a Multiple-Instructions Multiple-Data (MIMD) architecture. An MIMD machine has separate programs working on separate sets of data at the same time, and may have many separate CPUs, each with its own instructions and each processing its own data. The separate CPUs are interconnected so that they can cooperate to solve a problem.

It is difficult in an MIMD machine to provide a means for coordinating the activities of the several separate processors so that they can work on problems simultaneously. As more and more CPU's are added to the system, the overhead caused by interaction between them increases.

The problems discussed above provide particular difficulty when operating an "expert system," which can contain thousands of "rules" which add new facts to the databases. When a rule adds a new fact to the database the rule is said to have "inferred" the new fact, and rules interpreters are thus referred to as "inference engines." A rule in an expert system is generally expressed in the form "IF <condition>, THEN <action>," and takes the "action" when all of its "conditions" are satisfied.

There is no explicit control structure in an expert system to decide when a rule takes its action. In principle, when a new fact enters the database, the expert system should scan all of the rules to determine if any of them can take their action. Where there are many rules, this strategy can cause the expert system to run slowly. A new computer system is therefore necessary which can efficiently, quickly and economically run many lines of computer code as needed for a complex expert system.

SUMMARY OF THE INVENTION

A computer system especially for solution of real time inference problems is disclosed. The system includes a systolic cellular processor which provides predictable and responsive real time operation and fine grain programmability. The system comprises a plurality of separate processor cells each having its own local memory, the cells running simultaneously and operative to execute their respective program instructions in a predictable and responsive manner. A global memory is coupled via a global bus to the processor cells and provides data to the cells and stores data from the cells. The bus provides effectively simultaneous access of all cells to the global memory. A further feature of the system is a novel parallel programming language using English syntax and which provides synchronous and predictable binding of code to each cell. A graphic work station is provided as a user interface to provide visual access to each cell or to cell groups for ease of control.

The problems with the prior known computer systems are solved by the computer system disclosed herein which uses programs which are divided into cells to import variable values ("imports") from a global memory and to export computed values ("exports") to the global memory. A cell's imports are either computed in other cells or passed to the computer system from a host computer. A cell's exports are written to global memory for use by other cells or for transmission back to the host computer. The results of a calculation in one cell may be used as input to programs in other cells, whose outputs in turn may serve as input to other cells.

The computer system disclosed herein comprises, in the illustrated embodiment, up to 128 separate processors, each of which carries out the computations specified by up to 128 cells. Each processor has its own local memory which can contain both instructions and data. The 128 cells associated with each processor are executed one at a time in a predetermined order, but because of the features of the invention, they each appear to run simultaneously and in parallel. As a result, the system disclosed herein may have in the embodiment shown, as many as 16,384 cells, with each cell operating as though it has its own microprocessor which computes its own program at all times. The cells each operate in a predictable and responsive manner. Each cell provides a known response to its import events such that for a given import condition a predictable export is always provided. The response of any cell is not affected by other events extraneous to that cell. Each of the cells operates independently of the others according to its own programed rule or other function.

The 128 processors in the computer system communicate via a shared global memory. As each processor computes results, those results are stored in global memory where the other processors can read them as necessary.

With the computer system disclosed herein, it is relatively simple to control rules in an expert system, because an "IF" statement can be put into a separate cell which continuously reviews all the data that affects it. When a condition on an "IF" side of the rule is satisfied, the cell carries out the actions on the "THEN" side, and exports a new fact to the database.

A special programming language, known as the parallel cellular language (Paracell), has been developed for use in the disclosed computer system. Paracell provides a convenient method for dividing programs into cells which are responsible for exporting variables to be used by other cells.

With the Paracell language, a cell may import or export as many variables as desired. Information is shared between cells by referring to symbolic variable names. Because all cells import variables from global memory and appear to start working at the same time, and because all cells export updated variables to global memory when they finish processing, no cell may start processing again until all the cells have had an opportunity to write their variables into global memory. As cells export new values to global memory, the new values are buffered until the start of a subsequent cycle, so that all cells which import a variable during a processing cycle receive the same value for that variable.

With the computer system disclosed herein, there are considerable performance improvements relative to conventional computer design. By providing each processor with its own instruction stream, instruction transfer from the global memory bus is reduced, and global memory cycles can thus be largely dedicated to transfer data. Because many of a processor's data references are satisfied by information stored in its own local memory, each processor effectively has its own data stream as well. Finally, because local processors store their intermediate results in their own memories, global memory traffic is also reduced. As a result, the present invention provides for a system which permits solution of many separate problems simultaneously and efficiently.

The invention in another aspect provides for the emulation of custom fine grain processors such as can be implemented in a VLSI semiconductor chip, without the need for actual design and construction of such a chip. The present system employs a large grain processor such as the Motorola 68030, in which a program having a large amount of code is generally required for control of the microprocessor. The physical microprocessor is partitioned by the software of the present invention into a plurality of fine grain processors or cells which function as and which appear to the programmer and user as an array of individual processors each operating independently. As stated above, each of the fine grain processors or cells has its own memory and also has access to a shared local memory which is shared among a group of cells. Each of the fine grain processors or cells also has access to a global memory by which the cells can communicate among each other. The actual microprocessor thus emulates a number of separate virtual processors which are the fine grain processors or cells.

DESCRIPTION OF THE DRAWINGS

The invention will be more fully understood from the following detailed description, taken in conjunction with the accompanying drawings, in which:

FIG. 4 is a block diagram of the user processor of FIG. 3;

FIG. 18 is diagrammatic illustration of the database contained in a datablock of global memory;

FIG. 19 is a diagrammatic illustration of the export of data from cells within a frame and between successive frames;

FIG. 20 is a diagrammatic illustration of a navigator pyramid for visually representing multiple levels of cell matrices;

FIG. 23 is a diagrammatic illustration of memory usage in the cells of a processor; and FIG. 24 is a chart illustrating Paracell statements appearing on a work station display.

DETAILED DESCRIPTION OF THE INVENTION

A glossary of terms used in this specification is set forth at the end of the specification.

Figure 1:
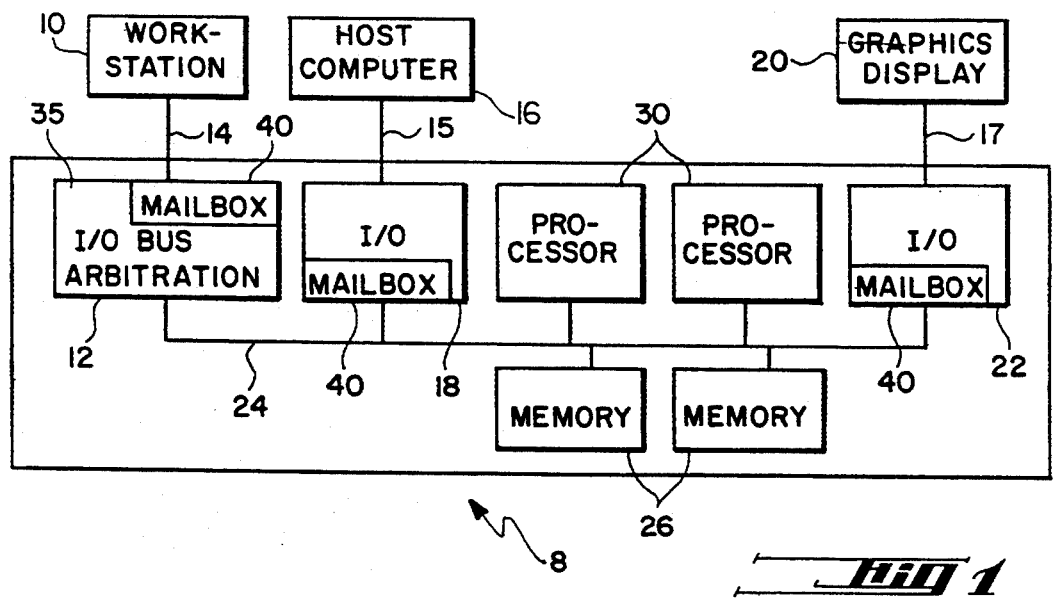
FIG. 1 is a block diagram of a computer system in accordance with the invention.

With reference to FIG. 1, a computer system 8 according to the present invention is shown. The computer system 8 is connected to a work station 10, a host computer 16 and, optionally, a high resolution graphics display 20. The system 8 comprises a combination of input/output (I/O) boards 12, 18 and 22, memory boards 26 and processor boards 30, each attached to a high-speed bus 24.

The work station 10 functions as a user interface for program development, and includes a program editor, compiler, incremental loader, symbolic debugger, and other facilities for managing programs. Work station 10 loads programs into the system 8 through the I/O board 12 via a high speed parallel bus 14. In the preferred embodiment, the system uses a standard work station, such as a Macintosh II, as the software development terminal.

The host computer 16 provides data to and stores data from the system 8 through I/O board 18 coupled by parallel bus 15. The host computer 16 can load a program into the system, write data into the system memory and retrieve results therefrom, and can copy programs out of the system memory and store it for later execution. Although the host computer system interface is optimized for data transfer, the host computer may also have control facilities similar to that of the work station 10 for interrupting the system, thus allowing the host computer 16 to serve as a software development device if the appropriate compilers and editors are available.

The graphics display 20 is coupled to the system 8 by means of I/O card 22 and bus 17, and permits high resolution graphics to be presented by the system.

Architecturally, the computer system 8 is composed of a number of independent computer processors located on processor boards 30. Each board 30 may contain several processors, and are preferably based on standard microprocessor chips such as a Motorola 68030. The system implementation of the illustrated embodiment has 128 user processors mounted four to a processor board, although the system is not limited to this number.

The main database for the computer system 8 comprises global memory located on memory boards 26. In the present embodiment, the global memory is arranged in units of 32 megabytes per module, with one module per memory card. Memory can be manufactured in other sizes, as desired. Preferably, the memory comprises standard commercial 1-megabit dynamic RAM chips, which typically have 100 nanosecond access time.

The I/O boards 12, 18 and 22 function as dual-port global memory cards which contain high speed parallel interfaces to the external devices 10, 16 and 20. When data is passed from an external device to the global memory on the I/O card, it becomes immediately available to all of the processors in the system via the global bus 24.

To accomplish data transfer, the computer system employs a wide bus having on the order of 40 bits of address, 32 bits of data, 2 bits for debugging, and several control lines. The computer system preferably uses a fixed bus allocation scheme to minimize the number of wires and bus drivers needed to control bus access and to reduce backplane and global bus interface complexity, arbitration overhead and cost. The bus is preferably designed as a flat backplane whose length is limited to the length of conductors that can be driven reliably at the full bus speed.

In the present embodiment, the bus speed is 40 nanoseconds per cycle. A computer system cycle permits each of the 128 user processors to have one bus cycle in turn. In the present embodiment, to give the 128 user processors one 40-nanosecond cycle requires 5,120 nanoseconds, or 5.12 microseconds. In the preferred embodiment, each user processor can transfer 4 bytes per cycle, permiting an overall gross data transfer rate per processor of about 780,000 bytes per second.

The sequence in which individual user processors are granted access to the bus 24 is controlled by a bus arbitrator 35 (BOSS) which has its own processor, high speed RAM, and standard serial I/O facilities such as RS-232. To improve space allocation in the computer system 8, the bus arbitrator 35 is part of the work station I/O card 12.

Because the computer system memory may take more time to cycle than the bus, the memory is interleaved in order to run the bus at full speed. To support this scheme, processor boards order their memory accesses according to memory bank. To maximize but utilization and to provide data coherency, the bus arbitrator will grant sequencing so that each multi-processor board gets access to successive memory banks on successive bus accesses. During any single clock period on the bus, one of the memory banks is guaranteed to be available for reading or writing. While many banks may in fact be available, the system enforces a rule that on any given bus cycle, only a specific bank may be accessed so as to assure predictable performance. In the preferred embodiment, where memory takes about 200 nanoseconds to cycle and the basic bus cycle is 40 nanoseconds, memory is interleaved eight ways to permit eight bus cycles to provide a total memory cycle time of 320 nanoseconds. This additional 120 nanoseconds provides time to perform a read/modify/write on every bus cycle for error scrubbing and locked updates.

Figure 2:
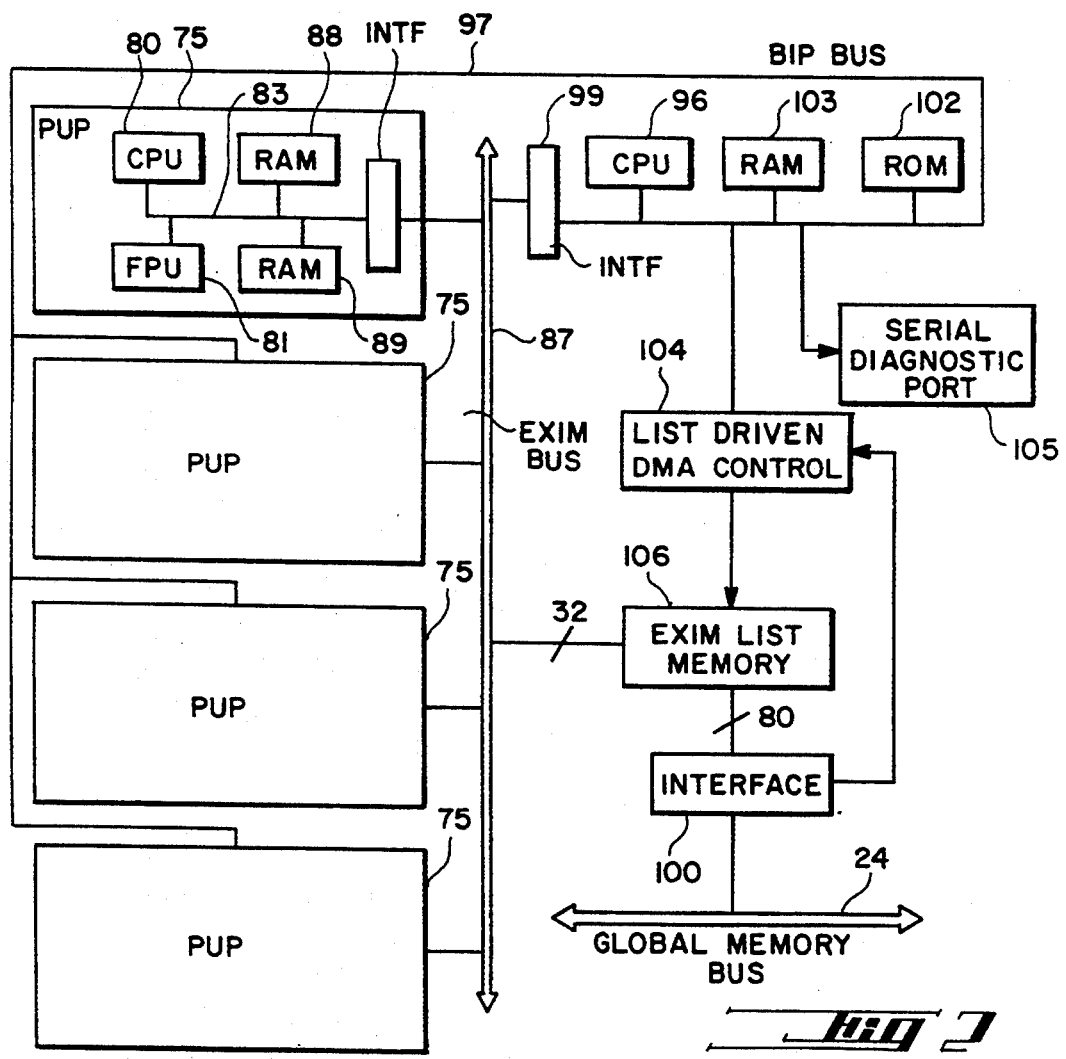
FIG. 2 is a block diagram of a processor board of the computer system of FIG. 1.

A processor board 30 is shown in FIG. 2 and includes four user processors 75 (PUPs), one of which is shown in detail. Each of the PUPs 75 has a CPU 80 such as a Motorola 68030 integrated circuit microprocessor, a local RAM memory 88, typically of four megabytes capacity, a fast RAM 89, and a floating point unit 81. A local bus 83 interconnects the functional units of the PUP and couples the PUP via an interface 85 to an EXIM bus 87.

Each of the PUPs 75 is coupled to a bus interface processor (BIP) bus 97 and then to a bus interface processor composed of CPU 96, RAM 103 and ROM 102. The bus interface processor controls the transfer of data into and out of the PUPs 75, and specifically into an out of the RAM 88 thereof. The BIP bus 97 is coupled to the EXIM bus 87 by means of the interface 99. In the illustrated embodiment, the CPU 96 is a Motorola 68020 microprocessor having the RAM 103 and ROM 102. The ROM 102 contains an initial program loader and BIP debugger. A list driven DMA controller 104 is coupled to the BIP bus 97 and to an EXIM list memory 106. The memory 106 is also coupled via an interface 100 to the global memory bus 24. The memory 106 is a random access memory for storing data and addresses of global memory accesses using the controller 104. A serial diagnostic channel 105 is also provided and is coupled to the BIP bus 97.

When power is applied to the system, the program in ROM 102 of the bus interface processor holds each PUP 75 in its reset state while software is loaded by the CPU 96 into RAM 88 via the global memory bus 24. After the initial program is loaded into PUP 75, the CPU 96 releases the reset line and the PUP 75 begins to run.

The processors 75 and 96 maintain an EXIM list, in memory 106 which contains for each exported or imported memory word its global memory address, its value and bits to control direction of data flow and type of transfer. This information is used to read to and write from global memory, and to transfer information between program cells. In the preferred embodiment, the memory 106 contains 32 bit datawords, 40 bit global memory addresses, and status flags, and has a capacity to store 16,384 one word transactions per PUP or 65,536 transactions per processor board 30. The EXIM list typically holds up to 16 imports and 8 exports for each cell. The list of imports and exports is sorted in global bus interlace order, allowing effective use of bus cycles as they are made available by the bus arbitrator. The list size permits the system to take advantage of all the bus transfer cycles which are available to the processor board during a system cycle (frame), without having to update the list during the cycle.

Although the processor 96 sets up transfers to the global bus 24, the transfers occur too quickly for the processor 96 to be directly involved. The processor 96 therefore communicates with global memory using the controller 104 which is driven by the EXIM list in memory 106. The controller 104 performs the transfers between global and EXIM memory without any direct intervention by the processor 96.

Each processor 96 maintains a mailbox 40 in the memory located on each of the I/O boards 12, 18 and 22. With appropriate commands to the respective mailboxes of the processors 96, the workstation 10 or host computer 16 can signal the respective processors 96 to load new programs into the processor's local memory, to enable and disable variables or program cells, and to carry out debugging functions.

The system can be debugged via a serial port 105 coupled to the serial channels of the processor 96. The debugger is in preferred embodiment based on a standard Motorola debugger modified as needed to work in the environment of the present multiprocessor system. The workstation 10 maintains a separate task which polls the processors 96 to assure that they are active, and to receive error messages.

Figure 3:
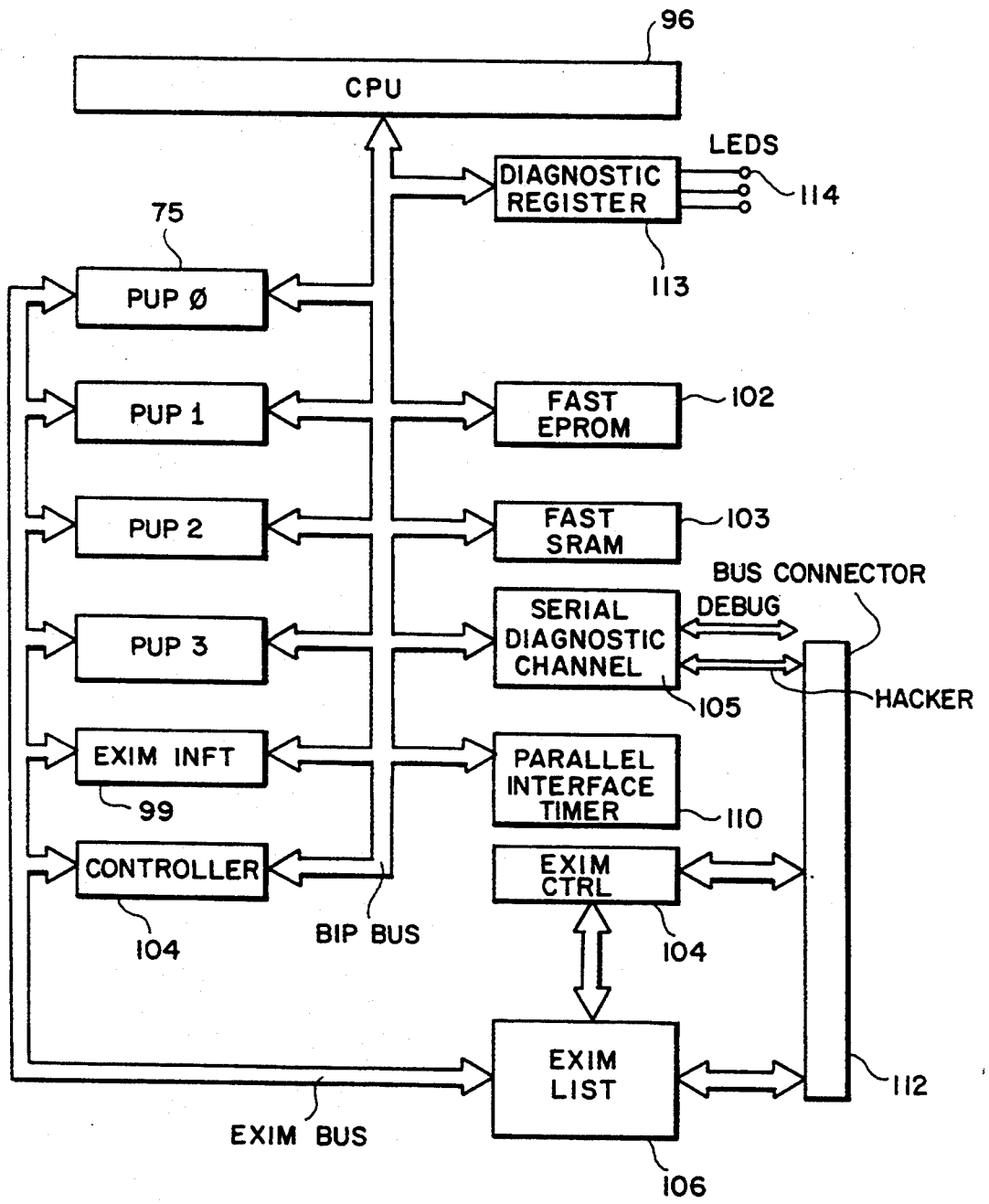
FIG. 3 is a block diagram of the bus interface processor of FIG. 2.

A more detailed block diagram of the multiprocessor board 30 is shown in FIG. 3. In addition to the functional units described above, the board includes a diagnostics register 113 which drives light emitting diodes (LEDs) 114 to provide a visual indication of board status, and a parallel interface timer 110 which provides timing signals for appropriate board operation. A bus connector 112 is provided to couple the board to the global memory bus 24.

The PUP 75 is shown in greater detail in FIG. 4. The RAM 88 includes a syndrome register 114, an error correcting code (ECC) chip 115, RAM planes 116, a RAM arbitrator 117, RAM controller 118, and address multiplexer 119.

Figure 5:
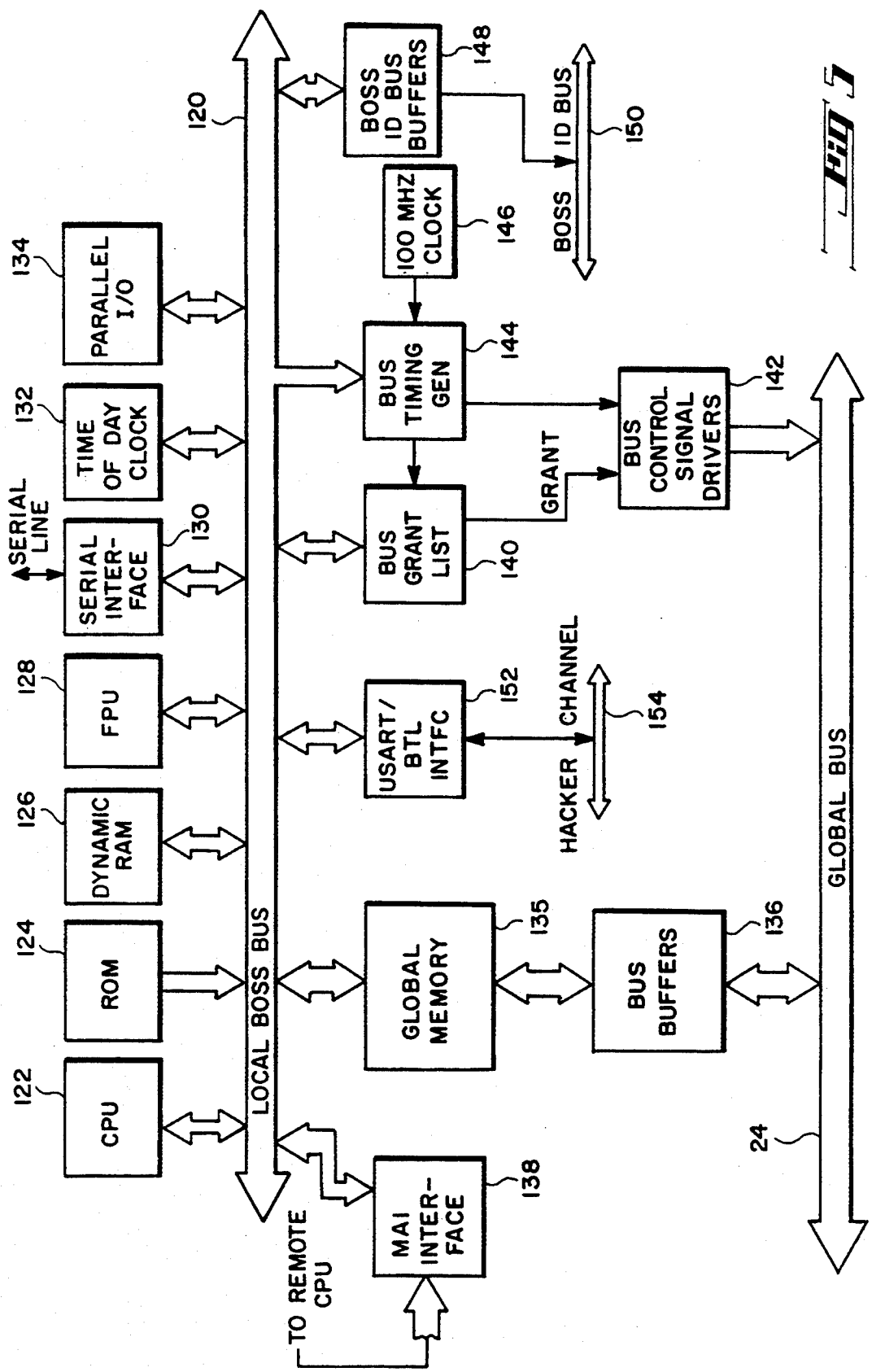
FIG. 5 is a block diagram of the bus arbitration board of FIG. 1.

The I/O board 12, called a BOSS board, provides bus arbitration and system control. This board is shown in FIG. 5. A local BOSS bus 120 is coupled to a CPU 122, a ROM 124, a dynamic RAM 126 and a floating point unit (FPU) 128. The bus is also coupled to a serial interface 130, a time of day clock 132 and a parallel I/O 134.

A memory 135, which is part of global memory for the system, is coupled to the bus 120 and is also coupled via buffers 136 to the global bus 24. The memory 135 is also coupled via a memory access interface (MAI) 138 by which the system can be connected to a remote CPU for remote access to the memory. The bus grant list 140 is coupled to the bus 120 and provides grants to the global bus 24 by way of signal drivers 142. A bus timing generator 144 provides timing signals to units 140 and 142 under the government of a clock 146. Identification of the BOSS board is provided by identification data conveyed via buffers 148 to the BOSS ID bus 150. A serial interface 152 couples the bus 120 to a hacker channel 154. To provide programmer access to CPU 122 and to associated memories for debugging purposes, as is per se known, the global bus 24 ID bus 150 and hacker channel 154 are typically provided on the back plane to which the BOSS board is connected.

Figure 6:
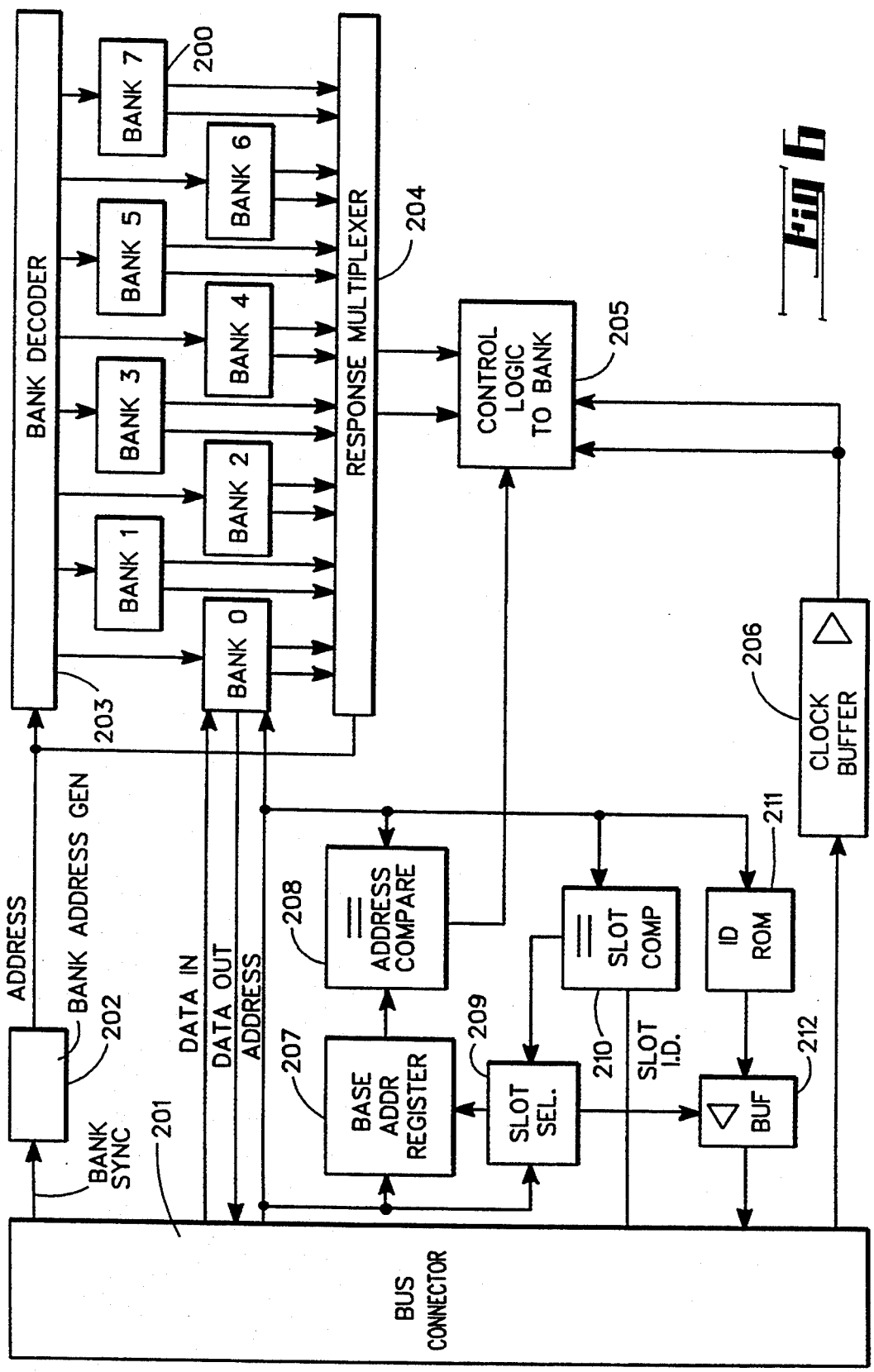
FIG. 6 is a block diagram of a global memory board of FIG. 1.

A memory board 26 is shown in preferred implementation in FIG. 6. The memory is composed of eight memory banks 200 which receives data and addresses from the global memory bus via the bus connector 201. Low order address bits are provided by bank address generator 202 to a bank decoder 203 coupled to the memory banks. The memory banks are also coupled via a multiplexer 204 to control logic 205. Clock information is provided by a clock buffer 206 to the control logic 205. The address logic includes a base address register 207 an address comparator 208, a slot selector 209, and a slot comparator 210. An ID ROM 211 provides identification of the memory board via buffer 212 for conveyance to the BOSS board.

Figure 7:
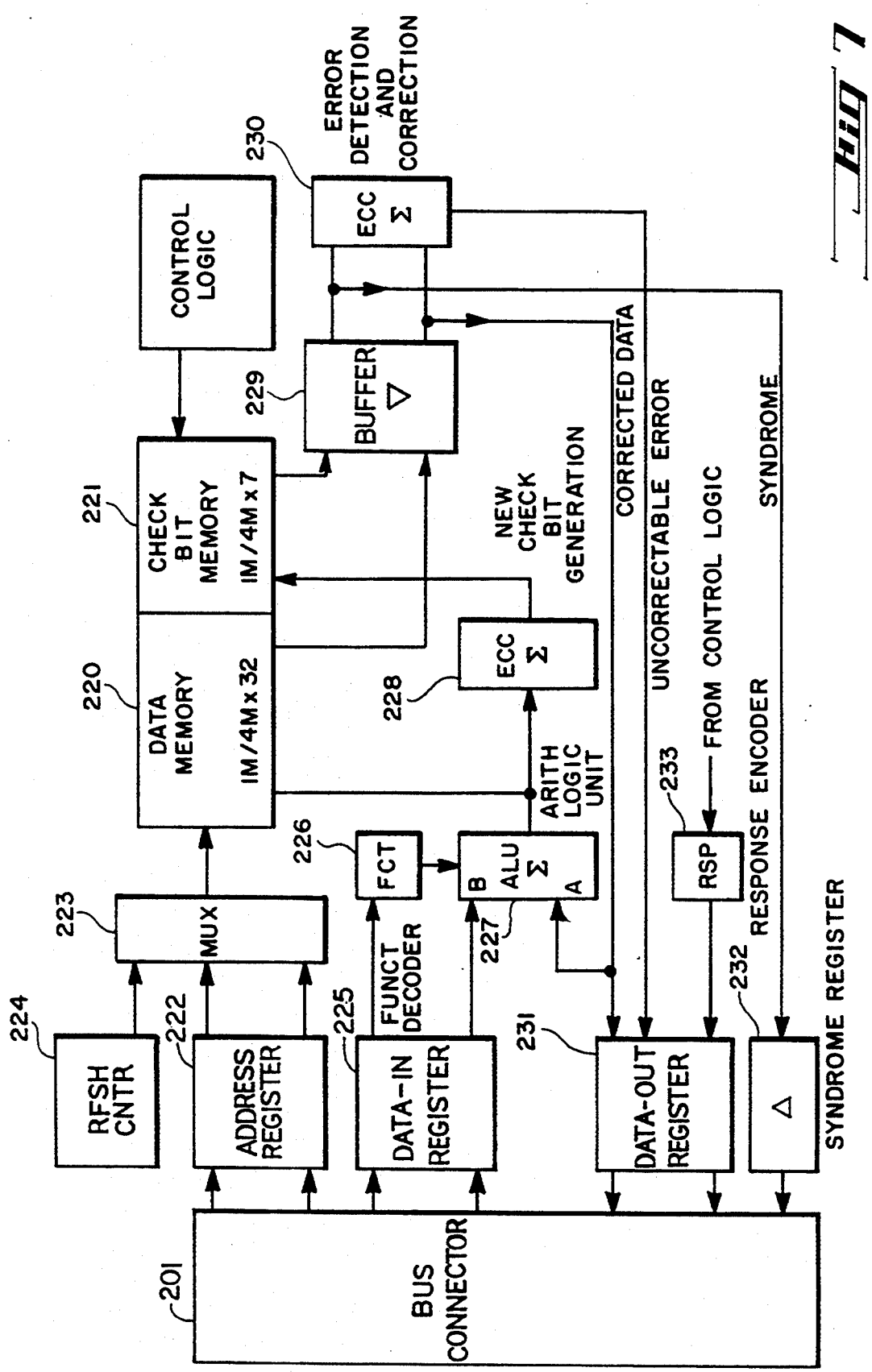
FIG. 7 is a block diagram of one of the memory banks of FIG. 6.

One of the memory banks 200 is shown in greater detail in FIG. 7. The memory includes a data memory 220 and a check bit memory 221. The data memory typically is composed of 1 megabit or 4 megabit chips. Memory addresses are provided from the global bus via the bus connector 201 to address register 222 and multiplexer 223. Memory refresh is controlled by refresh counter 224. Data is provided from the bus to data register 225 and then to a function decoder 226 and arithmetic logic unit 227. Error detection and correction is provided by ECC 228 which provides new check bits to check bit memory 221. The memories 220 and 221 are coupled via buffer 229 to ECC 230. Data is provided from buffer 229 to register 231 for application to the system bus. Error indications are provided from ECC 230 to register 231 for application to the bus. Memory operation is monitored and syndromes of errors in the memory are indicated by syndrome data provided via register 232 to the system bus. A response encoder 233 provides a response code for the function being performed; namely cycle completed normally, unsupported function, bank busy, and memory not present.

A feature of the invention is that the memory includes ALU functions. Function codes are associated with the addresses in the EXIM list and those codes specify operations to be performed on the memory word. For a write operation, an add function can be provided for adding data to memory. Alternatively, other logical or arithmetic functions can be provided by appropriate function codes. For a read operation, data can be read from particular memory locations and the data can be updated at that location, thereby reducing update time. By this technique, locked bus updates need not be employed. The function code associated with the address specifies whether to do a normal read/write or to use special ALU functions.

As an example, the arithmetic logic unit 227 can provide a sequencer and an event counter. If the sequencer value is equal to the event counter value, a processing mode is initiated for operation of the tile. If the sequencer value is not equal to the event counter value, the event counter is monitored during each cycle until the event counter value equals the sequencer value, upon which the processing mode is initiated. After processing, the event counter is incremented to the next sequencer value to denote the next value which is accessible for access by a tile. By this means, any number of tiles can be executing simultaneously and have shared access to the resources of the event counter or to devices controlled by the event counter.

The novel memory also permits distributed termination for a program divided among a group of tiles. A counter in memory controlled by arithmetic logic unit 227 maintains a count of the number of tiles working on a particular program. As each tile completes its task, the counter is decremented, and when a zero count is reached, an indication is provided that all tiles have completed their tasks. The memory system can also be employed for distributing portions of a program among tiles. A sequence value is assigned to each portion of the program, and each tile acquires the available sequence value and performs the associated task, after which the tile can acquire the next available sequence value for that associated task. Each tile is also operative to increment through addresses in order to sequence through tile group operations or through data in global memory.

The novel memory system also permits subword updates of the memory, as is often useful for input/output operations or for graphics operations. By this technique, portions of a word can be predictably updated without affect on other portions of the word. The arithmetic logic unit 227 can perform a logical function on any bit or group of bits of a word.

Figure 8:
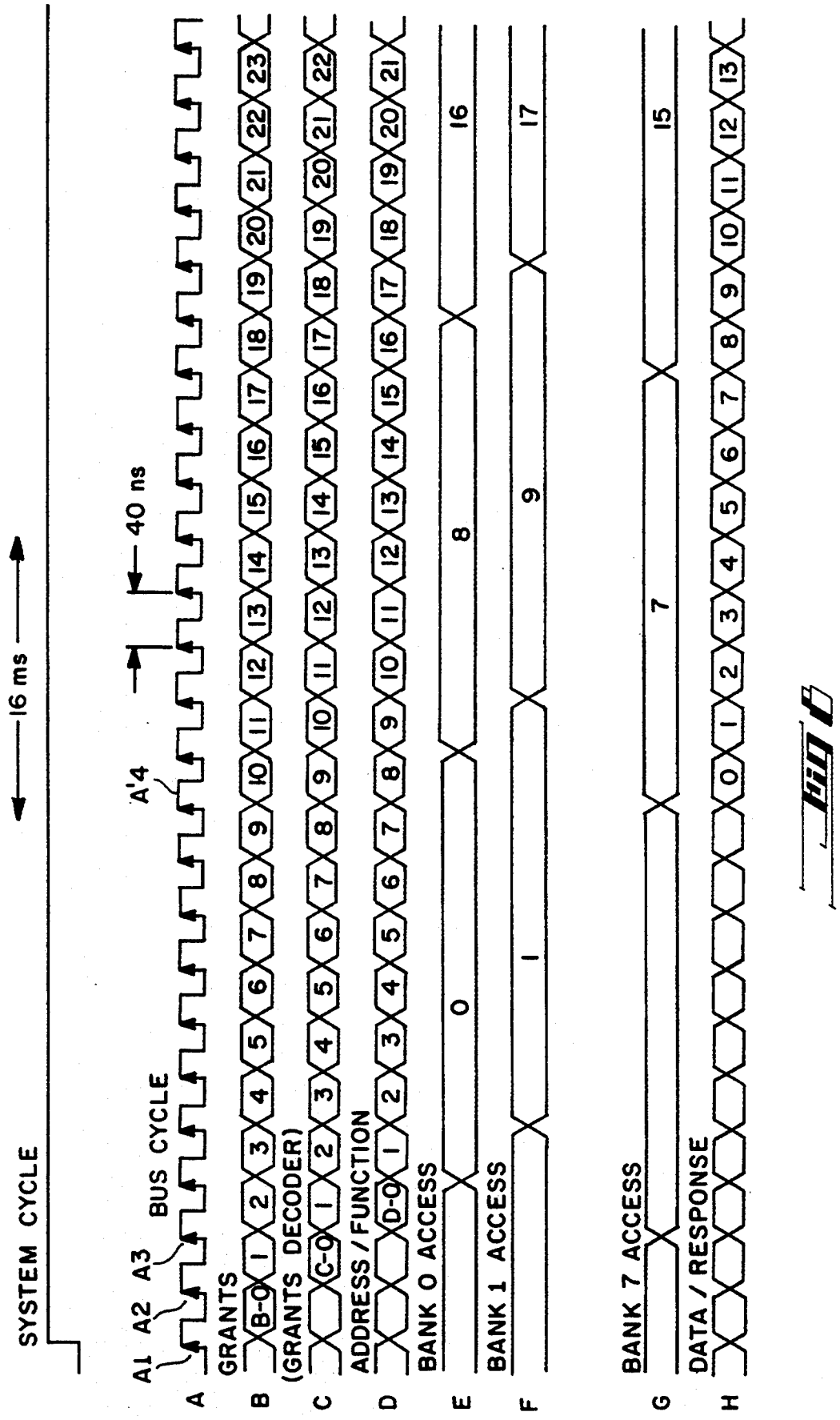
FIG. 8 is a timing diagram useful in illustrating operation of the system.

FIG. 8 is a timing diagram showing reading and writing operations for the global memory. Each processor is given sufficient access to the global bus 24 to export the results of its previous cycle and to import data for its next cycle. Because the bus is fast, each processor must set up its data transfer before it has bus access, and to optimize efficiency, a processor which is not ready to put data on the bus at the proper time loses its turn.

FIG. 8A shows the bus cycle where each cycle is about 40 nanoseconds. Data transfer to or from a processor takes three bus cycles. At a first cycle edge A1 of a first bus cycle, processor number 0 is granted a bus cycle by the bus arbitrator 35, and receives an address and command during cycle B-0, shown in FIG. 8B. Bus input signals are strobed into registers on each processor board at the active edge of the bus clock, without any gating or decoding.

At the active edge A2 of the second bus cycle, the processor receives the actual bus grant during period C-0 of FIG. 8C, but it still needs time to decode the command and address so that it can use the cycle. At the third bus cycle, the processor has decoded the command and address which were transferred to it, and it carries out the transaction during time D-0 of FIG. 8D. The process is repeated one cycle later for the next processor in the sequence. By overlapping the three phases of the transfer cycle, it is seen that the computer system can start a new bus cycle every 40 nanoseconds, even though the individual processors cannot operate that fast.

A write of data from a processor to global memory takes one bus cycle, during which time data is transferred from high speed registers associated with the processor to high speed registers on the appropriate global memory board. The data is then written from the fast registers on the memory board into the appropriate memory location during the subsequent seven bus cycles.

A read of data from global memory is split into address and data sections and thus transfers data to a processor during the opposite halves of two different bus cycles. Since memory cannot be read in a single bus cycle, data is returned eight bus cycles later. As shown in FIG. 8, during the first bus cycle, the address of the global memory word is transferred from high speed registers associated with the processor to fast registers on the memory board during cycle D-0. The memory obtains the data during time period E-0, which is eight cycles long. When the memory finishes cycling and the data becomes available, another bus cycle at clock A-4 transfers the data from the fast registers on the memory board to the fast registers associated with the processors, during period H-0.

To assure that all global data is updated coherently, the processors operate synchronously so that no processor starts a new timing frame until all of the other processors have finished their frame. A multi-word write to global memory from a single cell must appear to be atomic, and look as though the cell performed the write operation before any other cell can access the data. Any variable requiring more than a one word transfer must be updated without skipping an available cycle. A multi-word variable must be updated in specified order using every cycle available for the purpose.

The system time frame is set so that the frame takes 1/60th of a second, or about 16 milliseconds. There are therefore about 400,000 bus cycles in one frame. These bus cycles are equally divided among the 128 processors, resulting in 3,120 memory reads or writes for each processor per frame. These 3,120 reads and writes are shared among the 128 processing cells associated with each processor, so that each cell can have 24 bus cycles per frame. Since four bytes can be transferred on each bus cycle, each cell is able to import or export a total of 96 bytes per frame.

Figure 9:
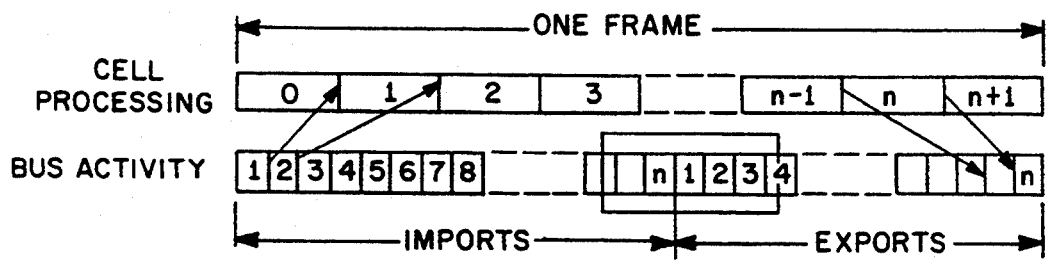
FIG. 9 is a timing diagram illustrating import and export timing.

Data buffering is needed since all cells must see the same set of values for each frame. When a cell computes a new value which is imported by another cell, the new value is stored in the EXIM list so that all cells importing the variable will not see the new value until the next frame. Processing starts with cell zero. While cell 0 is processing, cell 1 imports are read from global memory. Data import continues with the imports for cells 2, 3, etc. Since importing 16 words of data takes less than 1/128 of a processing frame, each cell's imports are ready by the time that cell begins processing, except for cell 0. Once all the imports are performed, the timing card switches the global bus from read to write mode and begins exports starting with cell 0. Since the import time plus export time for a cell is equal to the processing time, a cell's exports are always ready by the time its exports are scheduled, except for the very last cell, whose exports cannot be written until the next frame. This implies that there is a cell at the beginning of a frame which cannot do imports during that frame, and that there is a cell at the end of a frame which cannot do exports during that frame. This situation is depicted in FIG. 9.

The present system supports 128 cells, numbered 1 to 128 in each PUP, and there are two additional cells numbered 0 and n+1, (129 for this embodiment) which are used for debugging and other system functions. There is sufficient bus bandwidth for 16 imports and 8 exports for these additional system cells, but these cells import and export differently from the other cells.

Figure 10:
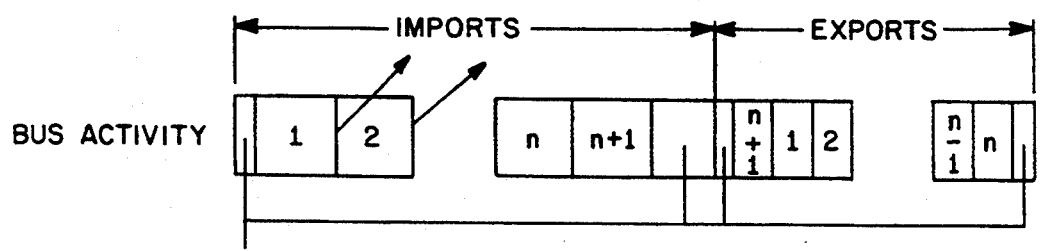
FIG. 10 is a timing diagram further illustrating the import and export timing.

A more detailed diagram of timing near the middle of a frame is shown in FIG. 10. The first import data comes from global memory bank 0 for the first PUP. The second PUP's first import is from global memory bank 1, the third PUP's first import comes from global bank 2, and so on. Cell 0 is given any global memory frames needed to synchronize cell 1 on global memory bank 0 at the beginning of the frame, and the rest of cell zero's imports come at the end. There are no imports needed to synchronize cell 1 with bank 0 in PUP 0, so cell 0 gets no imports at the beginning of the frame, and gets them all at the end of the frame. There are seven imports needed to synchronize cell 1 with bank 0 in PUP 1, so cell 0 gets seven imports at the beginning of the frame and one at the end. A similar synchronization is carried out for exports. Cell 0 absorbs bank skew on imports, and cell 129 absorbs skew on export.

When power is turned on to the computer system, the program in the ROM 102 of the bus interface processor 96 holds each processor 75 in the reset state while software is loaded into processor memory 88 via the global memory bus 24 by the processor 96. After the initial processor 75 program is loaded, the bus interface processor 96 releases the reset line, and the processor begins to run.

The processors 75 and 96 maintain an export/import (EXIM) list 106 which contains, for each exported or imported memory word, its global memory address, its value, and bits to control direction of data flow and type of transfer. This information is used to read to and write from global memory and to transfer information between program cells. In the preferred embodiment, the list holds a 32-bit data word, a 40-bit global memory address, and some status flags, and is large enough to store 16,384 one-word transactions per PUP or 65,536 transactions per processor board. The export/import list typically holds up to 16 imports and 8 exports for each cell.

Figure 11:
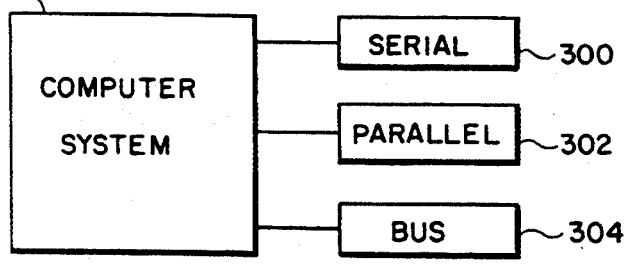
FIG. 11 is a block diagram illustrating the input/output channels of the system.

The system of the present invention can be coupled to external devices and systems by three different types of I/O (input/output) channels, as shown in FIG. 11. A serial channel provides serial interconnection via well known protocols such as RS 232, Ethernet, and SCSI. The parallel channel 302 provides high speed parallel interconnection directly from the global memory. The bus channel 304 provides a means of shared access to a portion of the system memory such as via a commercially available product of the assignee of the present invention known as a Bus-Link system. The parallel channel 302 supports real time video and high speed data base access. This channel is a 32 bit parallel interface with a protocol similar to the global bus protocol of the system 8, and allows communication directly with the global memory at the full speed of the bus.

Figure 12:
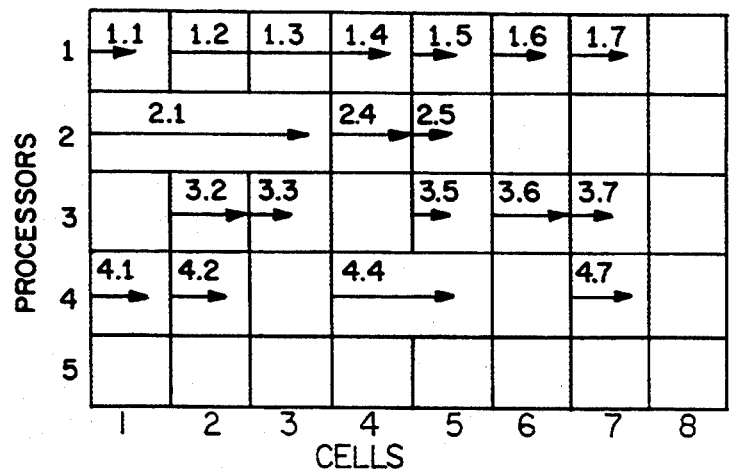
FIG. 12 is a chart showing a representative time allocation for tiles of the system.

The manner of allocating cell resources is illustrated in FIG. 12. In the example of FIG. 12, code has been written for the first 7 cells of processor number 1, the first, fourth and fifth cells of processor number 2, cells two, three, five, six and seven of processor number 3, and so on. The amount of time used by the tile in the cell is indicated by the length of the arrows within the cell.

In the example of FIG. 12, the tile in cell 1 of processor 2 requires more time to produce its variables every system frame. In this example, it is given the time allocation for three cells. Because this tile now uses three cells, processor 2 can now have only allocate 125 cells instead of the usual 127 additional cells.

The computer system processor can operate with standard computer languages, such as C or Pascal. A unique programming language referred to as Paracell has been developed, however, to make more efficient use of the computer system, and is part of the present invention.

Paracell uses ordinary English statement syntax as opposed to programming syntax such as that employed by common computer languages. Algebraic syntax may be freely mixed with English statements. Because ordinary syntax is used, words may be given multiple definitions based on context, and rather than rely on punctuation characters to group or separate blocks of code, the Paracell editor uses intuitive graphics, such as the use of color, shading, boxes, lines, and indentation.

A Paracell program is made up of a number of independent units, called tiles, which are maintained by a Paracell editor. The tile is the smallest programming entity (grain size) which can be manipulated as a unit, and this programming entity is tied or bound to a cell which operates according to that tile program. A particular tile is bound to a particular cell and the tile code is bound synchronously to its cell. A single tile can be bound to one or more cells, and multiple tiles can be bound to one or more cells, each tile operation for a given bound cell being operative during a predetermined time slot within a frame. The tiles can thus be allocated to the cells in an intended manner to achieve a given process or operation.

Figure 13:
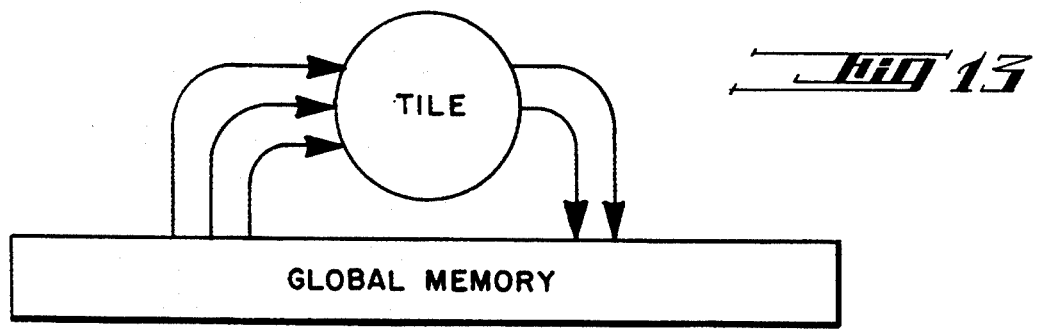
FIG. 13 is a diagrammatic illustration of a tile importing data from global memory and exporting data to global memory.
Figure 14:
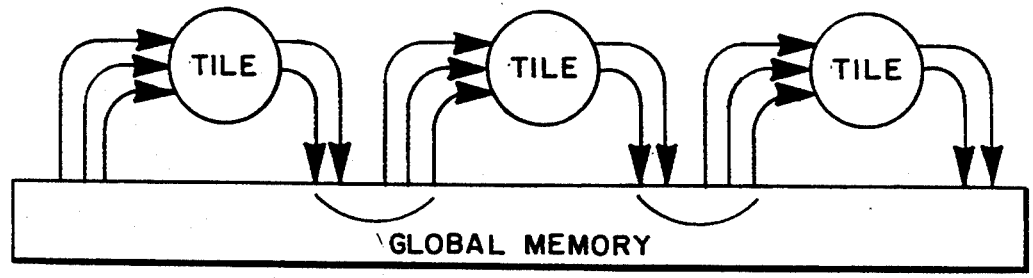
FIG. 14 is a diagrammatic illustration of multiple tiles cooperating with global memory.

The tiles each import data from global memory, transform the data in accordance with the particular tile code, and export results back to global memory. This operation of a tile is illustrated in FIG. 13. In concept a tile can be considered a transform which converts input data to output data. The tiles do not interact directly, but interact only through global memory by importing data generated by another tile and generating results which can be processed by another tile. The interaction is as shown in FIG. 14. Each tile runs continuously and in parallel with the code of other tiles. Each tile can run one or more statements or rules, and the tiles can be of different types. The tile types can be predefined by templates to permit a user to program the system by filling in the templates blanks.

One type of tile is the rule tile which provides an if-then statement or rule to be performed by the associated cell. The segments can have any number of if conditions and any number of then actions. Another type of tile is the search tile which provides the ability to specify a search for a particular value, and provides the search mechanism often used in an inference engine for artificial intelligence and other purposes. The search tile can be made to operate over a restricted set or over the entire memory space of the system.

A neuron tile can also be provided where inputs are processed in accordance with an input function and an output function then produced. A proportional, integral/derivative (PID) loop can also be provided as a tile type. Such a PID loop is commonly used in control of continuous processes such as in manufacturing control, and provide a method of adjusting the parameters of a process based on parameters set within the loop. The PID loop tile provides the user access to the variables to permit adjustment of their values. Using the PID loop tile, a user can construct simulations of any number of process control systems and refine the control loops prior to actual installation. Timer tiles can also be provided to provide calendar time and countdown timing. When the counter reaches a preset value or zero, the tile output can be employed to trigger another event.

Figure 15:
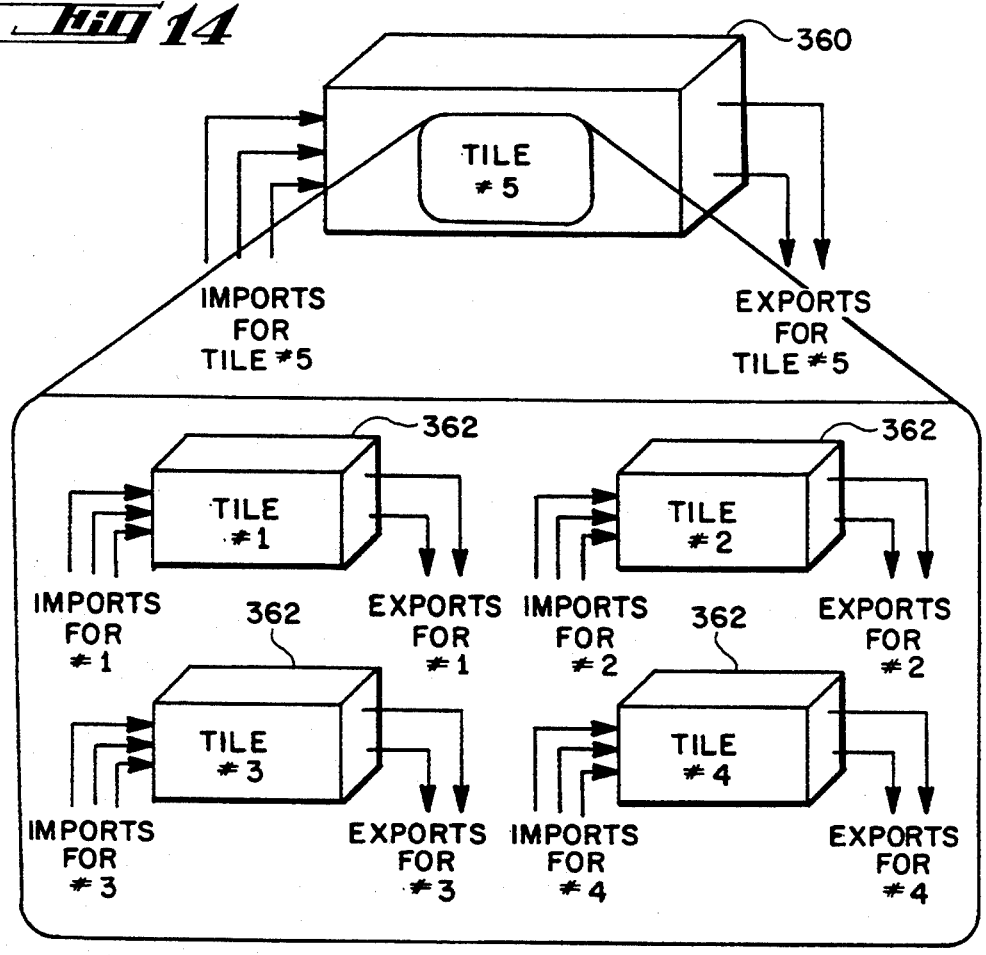
FIG. 15 is a diagrammatic illustration of the grouping of tiles into a larger effective tile.

Tiles can be grouped together to provide a single function, and the tile group can be treated and appears as a single tile having its own imports and exports. This is illustrated in FIG. 15 wherein a tile cluster 360 is displayed on the work station screen as the aggregate of the imports from global memory and exports to global memory. The tile 360, labeled 5, is composed of tiles 362, labeled 1 through 4, which are not shown on the display, unless the user elects to "open" the displayed tile cluster. Complex functions can be implemented by clustering of appropriate tiles, and a predefined cluster can be called from a tile library as needed.

Figure 16:
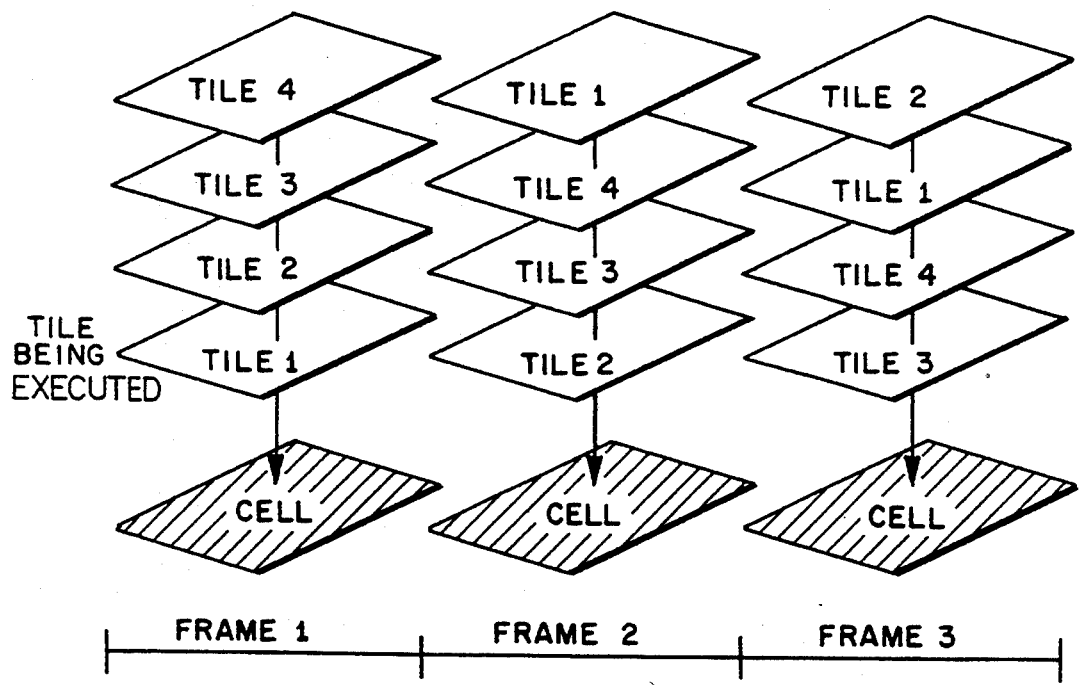
FIG. 16 is a diagrammatic illustration of multiple tiles assigned to a single cell for execution in sequence.
Figure 17:
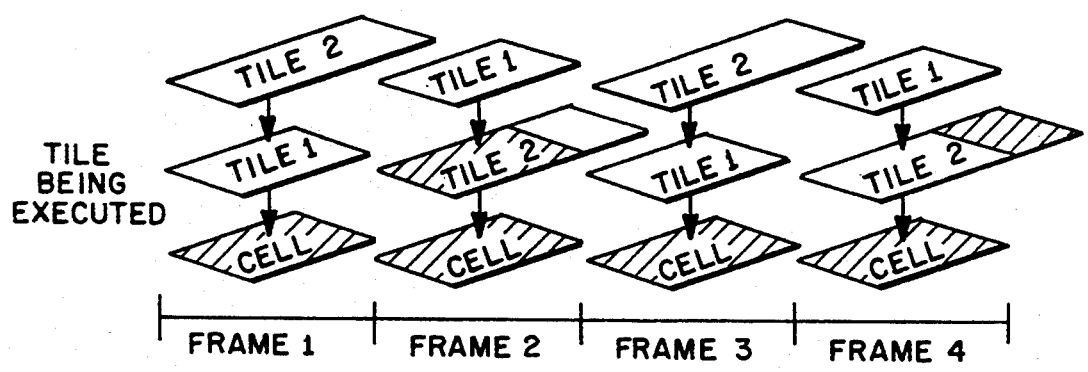
FIG. 17 is a diagrammatic illustration of the scheduling of tiles where some tiles require more than a single cycle to execute.

FIG. 16 illustrates execution of four tiles which have been assigned to a single cell. After executing, the tiles are automatically put at the end of the sequence. Referring to FIG. 17, during frame 1, tile 1 is shown executing. In frame 2, tile 2 is executing and tile 1 has been moved to the end of the sequence. During frame 3, tile 3 is executing and tile 2 has now moved to the end of the sequence. The tiles continue to execute in round-robin fashion for each cell.

FIG. 17 illustrates the scheduling of tiles where one of the tiles requires more than a single frame to execute. The shaded area of the tiles indicates the portion of the tile that is executing. In frame 1, tile 1 is executing. In frame 2, the shaded portion of tile 2 is executing. In frame 3, tile 1 is again executing. In frame 4, the shaded area of tile 2, which did not execute during frame 2, is executing during frame 4.

The cells of the system have a fixed allocation of resources whether or not any lines of code are being executed. If no code is entered into a cell, that is if no tile is bound to a cell, the cell runs no code, imports null values and exports null values continuously until code is entered into the cell to be run. According to the specified tile sequence, the last write in a cell wins, and the last cell in a frame wins.

The cells have parallel access to the database, called the Parabase, and permit data to be imported or exported during a single frame. The Parabase global memory data block is shown in FIG. 18 and includes a header for efficient access to the block of memory. The memory block is typically four kilobytes long. Each cell can read data within the import limit without regard to any other access. The read is treated as a single fetch from global memory without any check being made. Short writes are accomplished in the same manner. The writing structure is somewhat more critical since the write may disturb the correlation between a variable and other data which are written by different tiles during different frames. In real time applications however, data correlation is usually not of importance. To read or write the entire structure, multiple reads can be continuing over multiple frame times in an asynchronous manner. Coherence is maintained only within a single frame. Beyond a frame time, the read checks the header to make sure that a write is not in process on that item. If a write is not in process, the read system toggles the "read in process" warning and then reads the data block.

All tiles bound to cells at the beginning of a frame receive their imports simultaneously, process their computations in parallel and provide their exports at the end of the frame. The Paracell program is the collection of tiles associated with particular cells. Tiles associated with a cell are bound to it one at a time and run during respective time slots within a frame.

The tile execution schedule within a cell depends on how many tiles are associated with the same cell, because all of the tiles associated with a cell are run in a round-robin order (See FIG. 16). If there is only one tile associated with one cell, the tile is permanently bound to the cell and receives all of the execution time allocated to that cell and runs at 60 hertz. If there are two tiles associated with a cell, each one is bound to the cell on alternate frames, and runs at 30 hertz.

A tile may be associated with more than one cell, in which case it gets turns at execution from each of the cells with which it is associated, as in FIG. 12.

The tile is defined by its imports, state, computation, exports, group and schedule.

The cells are defined by cell memory, cell time, cell imports, and cell exports. The cell memory is the quantity of local memory available to the tiles associated with the cell. Cell time is the processing time allocated to the bound tile during each frame. Cell imports and exports are specified by the EXIM list allocated to the cell and are used by the bound tile. During the frame when a particular tile is run, that tile receives the benefit of the cell's entire allocation of imports, exports and processing time. The lists of cell exports and imports maintained in memory 106 (FIG. 2) are dynamic, changing automatically as different tiles are bound for processing by a cell.

The basic tile is statically bound to a cell and gets the cell's entire resources. There can be only as many basic tiles as there are cells. In the present implementation there are 512 cells per processor board, and up to 32 processor boards, thus a maximum of 16,384 basic tiles.

As discussed, the tiles can be combined into tile groups which are associated with one or more cells in the same processor. Grouped tiles may use all of the resources of all of the cells with which the group is associated. For example a tile might require 30 words of imports and 12 words of exports instead of the usual 16 words of import and 8 exports. Puting this tile into a group associated with two cells gives the tile twice as many imports and exports and twice as much processing time as usual whenever it is run. The affect is as if the tile group were run in a cell which is twice as big as normal.

Normally a tile state is hidden from all other tiles and the tiles are treated as if they execute in parallel. A special tile group is known as a tile sequence and can violate the normal rules in an orderly way. Tiles in a tile sequence may read state information from prior tiles in the same frame. In addition, tiles in the sequence can execute in a user specified order during a frame so that references to variables computed by tiles earlier in the frame are guaranteed to be the result of the current frame's execution of that tile. This permits tiles to compute values which are passed to tiles later in the same frame without having to wait for the next frame.

Tile sequence operation is illustrated in FIG. 19. Cells A through E are operative in a frame in this example. In usual operation, the cell A exports data in frame 1 and this data is imported to cell E in frame 2, as shown by arrow 350. Cell E can also export data in Frame 1, which is imported to cell A in frame 2, as shown by arrow 352. For faster operation, cell A can export data to cell E during frame 1, as shown by arrow 354. Tiles in a sequence can thus pass data to later tiles without waiting for the next time frame. Data which are passed to later tiles in the same frame are exceptional (piped) variables in that they are not stored in global memory and are discarded at the end of a frame. A tile may preserve the value by writing the value to global memory as a standard export. Pipeline variables are defined by special notation in the data dictionary. Once these variables have been entered into the dictionary, the pipeline variables are referred to in the same way as any other variables. In order to avoid confusion however, the editor displays piped variable names in a different color or other distinguishable presentation on the display screen. Piped variables are not accessable to tiles which are outside the sequence, although any tile in the sequence may copy the variable into a global variable which is universally accessible.

Tile sequences are determined such that the "last write wins" when two or more tiles have export access to the same variable. Where two or more tiles must update the same variable, the order of tile operation is allocated, and those tiles are assigned to the associated cells to produce the exports ordered such that the intended export will always be produced. The EXIM list defines the sequence of exports and imports. If a given tile must "win", the order of tile binding to the cells is specified to assure that win.

Tiles are stored in the distributed tile database which is maintained by the work station. These tiles can be displayed and modified by the tile editor. Users can create tiles on their own, or by using a tile template from a Paracell library and modifying the template to suit the application.

A graphic interface, called a navigator, provides a means for managing and viewing the tile database by permitting the display of small groups of tiles to varying levels of detail extendable down to particular tiles for access to the code in that tile. The navigator has a pyramidal structure which contains levels of 3×3 matrices of tiles. The Paracell program is thus organized into groups of tiles at various levels to create a hierarchieal view of the program. This navigator tool is needed by reason of the large number of processor cells which comprise the present system. In the present implementation there can be 16,384 processor cells, each of which can run an arbitrary number of tiles, and the large number of tiles and variables makes system and program management difficult, without the navigator tool herein disclosed.

The navigator pyramid is depicted in FIG. 20 and shows a top level of tiles arranged in a 3×3 matrix 400. One tile 401 is expanded into another 3×3 matrix 402 displayed at the middle level. This matrix includes a tile 403 which is expanded into yet another 3×3 matrix 404 shown at the lower level. Each matrix of 3×3 tiles can be displayed at the workstation 10. Each display tile, or window, may contain code or another level of matrix. Each level of the pyramid can consist of another 3×3 matrix, the lowest level matrix containing only tiles, at which level the code of those tiles can be viewed. It is not necessary that all elements of each matrix contain information; some elements of the matrix can be blank.

Figure 21:
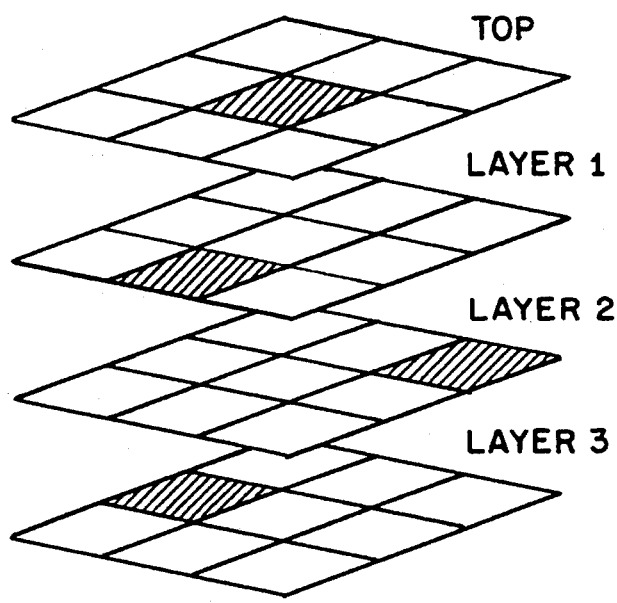
FIG. 21 is a diagrammatic representation of multiple levels of cell matrices illustrating a path through the navigator pyramid.

Multiple layers of the pyramid can be displayed, as shown in FIG. 21, with each tile highlighted which is expanded into the next layer. In this way, a graphical view is provided of a thread through the layers of the pyramid.

Figure 22:
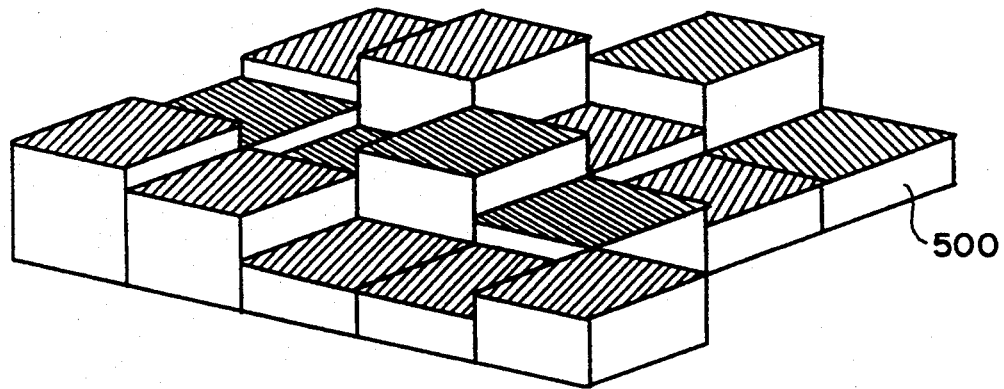
FIG. 22 is a diagrammatic illustration of the amount of time used by tiles in each cell.

FIG. 22 shows a 3-D view of tiles and associated cells, and depicts the amount of time used by the tiles in each cell. Each cell position 500 has one or more tiles represented by the height of the block at that position, and with the shading of each block representing the compute time for that tile.

Memory usage of the cells is shown in FIG. 23. The shaded cells indicate that no further memory is available for that cell. The visual displays of FIG. 22 and FIG. 23 are useful for managing the execution and assignment of tiles to the cells. Other graphical displays can also be provided to indicate for example, the amount of cell time used by its tiles.

Tile execution occurs on a round-robin basis within each cell. The execution of tiles can be tracked by a user and displayed such as for debugging purposes or for changing import and export data for one or more tiles.

The navigator contains the complete database system that tracks all the information within the system, which allows different views of the system to be presented to the user on the workstation screen.

The work station 10 provides an editor which permits users to write programs and to load them into the computer system for execution, to edit code by changing the text of a program, to manage code by specifying which project a tile belongs to, to find out about variables by obtaining their documentation and lists of tiles where they are referenced, to move a tile from one display level to another, to group or ungroup tiles, to move a tile to another processor, or to change the order in which tiles are executed.

The work station 10 also permits control of Paracell debugging by enabling or disabling variables or groups of variables, tiles, processors, or the entire computer system, and by providing spell checking software which corrects user input. The work station can also be used to monitor program operation by sampling and plotting variable values, by trapping when variables are changed to find out which tile was trying to change them, by obtaining statistics on time and memory use by various tiles, and by assuring that the system hardware is operating correctly while a program is running.

After a user edits the contents of a tile, the editor automatically (1) converts the amended tile from its source code format into a form which is executable by the computer system, (2) transmits the new tile code to the computer system, and (3) directs the bus interface processor on the appropriate processor card to load the new tile into the correct memory locations. The computer system cycle is not delayed while the new code is being loaded into the processor and prepared for execution.

As shown in FIG. 24, each tile contains statements which are numbered from 1 to 10. Each individual statement may itself be expanded into 10 statements within the major statement. Statement numbers 500 are associated with locations in the tile, and not with the particular statement.

A statement takes the following form:
name [enabling condition] condition ... action(s).

Each of the statements has an "enabling" condition 502 which specifies conditions under which that statement can run. Enabling conditions refer to enabling variables in an "if" condition 504 in the statement. Names, enabling conditions, and conditions are optional with a statement. If no enabling condition is specified, the system defaults to an enabled condition.

At the beginning of each system cycle, the enabling conditions for all statements in a tile are tested to create a list of enabled statements. Statements whose enabling conditions are satisfied are enabled to run during that cycle. Because all of the cells run in parallel, all of the statements obtain the same values for global variables.

Code execution can be conditioned on changes in variable state. Paracell allows users to detect positive and negative edges as well as zero and nonzero states. For example, the enabling condition [A turns ON] shown at 506 is satisfied only during the system cycle immediately after the system cycle when "A" changes from OFF to ON, and is not satisfied again until "A" is turned OFF and then ON again. Similar rules apply to conditions such as (1) [Level>X], which enables if the value of Level is greater than X; (2) [Level becomes>X], which enables on the cycle after the cycle during which the value of Level becomes greater than X; and (3) [Level leaves the range X to Y], which enables the cycle after Level leaves the range X to Y.

In general, transition enabling conditions are valid for exactly the one cycle after the cycle during which the monitored conditions becomes true, and then do not become valid again until the enabling condition ceases to hold for at least one system cycle, and then holds again.

Time dependent predicates may be included in the part of any statement. The "if" part of a statement is not processed unless the enabling condition is enabled. Thus, if a predicate is put in the "if" part of a statement, the predicate is examined on every cycle to see if it is satisfied, but the conditions in the "if" are not examined unless the statement is enabled.

In addition to enabling or disabling entire tiles, users may refer to slot numbers to enable and disable individual statements in a tile. If the user "disables" a statement, the statement cannot be executed until it is enabled again. As shown in FIG. 24, disabled statement 508 is displayed on the editor screen with a different background so that a user can keep track of it. Statements can enable and disable one another by manipulating global variables.

If a user wants more than ten statements in a tile, each statement slot may be expanded to ten additional slots. In the preferred embodiment, this is accomplished by placing the cursor over the desired statement or slot position and pressing the cursor mouse button twice. Subordinate slots are numbered n.1, n.2, and so on, and have the same enabling condition as their primary slot. When all of the slots are in use, the cell is "filled," and cannot hold any more statements.

If a main slot is disabled, the editor asks the user if all subordinate slots should be disabled as well. If an individual subordinate slot is disabled, however, other slots are not affected.

Paracell supports loop constructs which operate like timers and counters in programmable controllers. Statements are possible such as [Set A true for 10 minutes] or [Wait 5 minutes, then set A true].

The "Wait" command is an exception to the general rule that variables exported from a statement are not written to global memory until the statement finishes. If a statement is suspended by a "wait", exports computed before the "wait" are exported at the end of the cycle during which the wait is encountered. Otherwise, a value would never be written to global memory but would be deferred until the end of the 5 minute interval. The wait statement not only suspends statement execution for the stated-interval, it also forces variables computed before the wait to be written to global memory at the end of the current cycle rather than waiting until the end of the wait. A wait in a statement in a cell has no effect on other statements.

Paracell supports two classes of loops: (1) loops that occur within a system cycle and (2) loops that occur once per system cycle. There are also loops which search collections of information at the rate of one item per system cycle.

A dictionary is provided in memory for storage of variables entered by users and retained by author and associated tiles. The vocabulary of Paracell can be extended through word substitutions and aliasing. When a programmer enters a word which is unknown to the Paracell editor, the editor offers the programmer the opportunity to define the word in terms that the editor understands. Once the new word has been defined by the programmer so that the Paracell editor understands it, the definition is recorded in the dictionary associated with the tile so that the editor can understand the new word.

The user can select an existing word and have the editor accept it as a synonym for the previous word. Synonyms only affect the relevant name dictionary. Identifying a new name as a synonym of an existing word sets up a link between the dictionary entry where the new name appears and the dictionary entry in which the existing word is defined.

The user can also specify a new word to be part of a class. A class is essentially a template that tells how to make new instances of the class. An "instance" creates a new object of a class which is already known to the editor. The object is allocated space in global memory, and if it is not an inherent object, the new object is added to the list of members of its class.

Users can also define classes in terms of ancestor classes and attributes. Values must be specified for all required attributes in order for a new instance to be created. Attributes which are not specified are given their default value depending on whether the attribute has a default value or not.

Attributes of ancestor classes are included as attributes of the new class. If there is a conflict between attribute names, the name from the ancestor listed first is used without qualification, and the other name is qualified by preceding it by the class name and a symbol such as ">."

Attributes are specified in terms of default values and whether they are indexed or not. Indexed attributes may be searched more rapidly than attributes which are not indexed, but building and maintaining indices consumes both memory space and processing time.

Finally, the user may specify new attributes for existing instances. The user specifies a class name, default value, whether the attribute is required, and whether the attribute is indexed or not, and the attribute is added to the specified class. This changes the template so that later instances are created with the new attribute. If the new attribute has a default value, the default value is applied to existing objects. If there is no default and the attribute is not specified, the value of the attribute is the default for its data type.

The programmer need not specify the type of data which is to be stored in a new variable because the Paracell support software adapts to whatever is stored in the variable. In the preferred Paracell embodiment, the editor recognizes variable classes for: 32 bit and 64 bit floating point numbers, 32-bit integer, 80-bit real numbers, strings of up to 250 characters, words defined as characters in strings separated by spaces, Boolean algebra, characters, and enumerated types. Any variable may be assigned a value of any type. Appropriate type conversions are carried out automatically so that variables may be manipulated by a program. If conversion is not possible, a run time error is signaled via the debugging bus.

A "type" function determines the kind of data stored in a variable during the cycle when it is called. Similar checking operations are available for all built-in Paracell data types and for user defined types. These functions allow a user to write a program without concern about declaring types in advance.

When a new object is created, it is given a default value which depends on its type. Integers, floating point and real numbers default to "not a number", strings default to blank lines, booleans default to "not a number", characters default to blank spaces, and instances of user defined classes default as specified by the user. Until a new value is exported by a Paracell cell or set from the workstation or read in by an I/O card, the object has the value "not a number", indicating that a value has not yet been computed.

Type conflicts which might lead to errors are minimized by defining conversions from one data type to another. Numbers can be converted to strings, and some strings can be converted to numbers. Booleans are converted to 1 and 0, and strings and characters are true if they are any value other than empty. Paracell assigns a computed object the "Error" attribute and leaves the value as it was only when all efforts to convert data to compatible types fail.

Paracell databases are collections of Paracell objects which are associated into named sets. Users can search sets, identifying objects by looking at attribute values, and then modifying attributes of selected objects. Sets are usually searched at the rate of one object per system cycle in each cell. If users want faster searches, sets of objects must be divided among multiple cells.

Paracell supports the usual arithmetic functions of addition, subtraction, multiplication, division, and comparison, as well as standard trignometric functions. Arithmetic error conditions result in values as specified in the IEEE floating point standard and "Error" attributes are set. Error attributes do propagate in calculations.

Paracell also offers the usual string operations. Paracell programs may perform a string search of any data in the PIM regardless of its structure. Once the string is found, Paracell has found the object in which the string occurred, not just the text string.

Filters are a special class of built-in function which allow cells to qualify variable values before processing them. Filters are used to average, band, integrate, differentiate, and otherwise make variables more amenable to processing by cells. Filters are computed before enabling conditions are examined and before statements are executed, and compute whether or not statements which refer to the filtered values are enabled in order to prevent loss of information. If a filter computes a derivative, for example, the new value must be processed in order to maintain accuracy whether a statement looks at the derivative or not.

Paracell objects may be created and deleted either from the workstation or by Paracell programs in cells. There are several ways to create objects, including entering an unfamiliar name into the editor to create a new variable; editing a dictionary and defining new names; and using a "create" command.

To eliminate an object, the user enters a "kill" command either from the workstation or from a Paracell program. An object killed from a program is permanently lost. An object killed from the workstation support software may be reused if the operation is put into an "undo" buffer. In order to minimize accidents, the editor verifies kill commands from the work station, but kill operations in cells are not checked.

If a named object is killed from the workstation, the editor checks to see if any cells refer to the object. If there are no cells referring to the object, the editor kills it. The name and all its aliases are removed from all dictionaries, global memory space previously allocated to it is recycled, and all knowledge of the existence of the object is erased.

If there are cells referring to the object, the editor flags the dictionary entries for the object as "Killed" and sets the "Killed" flag in memory. Once the "Killed" attribute is set, cells which import the object get a default value. Since cells which refer to the former object are still running, dictionary entries cannot be removed. The dictionary entries and global memory space are discarded only when the last cell referring to the object is discarded or changed so that it does not refer to the object.

The embodiment described above is operative as a parallel processing system for high speed real time inference and similar problems, such as for use in artificial intelligence applications. The invention is also operative using the same system architecture and software control to provide the emulation of fine grain processors such as are present in a VLSI semiconductor chip. This emulation can be employed as a design tool for the design of fine grain processor chips or can be employed in the place of an integrated chip containing multiple fine grain processors. For many purposes therefore, the emulation operation of the present invention can obviate the need for the design and fabrication of custom VLSI chips, while achieving the performance provided by such chips. In the system described above, a large grain microprocessor, such as the Motorola 68030, is employed in which a program is generally required which has a large amount of code for control of the microprocessor. In accordance with this invention, the physical microprocessor is partitioned by the software of the invention into a plurality of fine grain processors or cells which function as, and which appear to the programmer and user as, an array of individual processors each operating independently. Each of the fine grain processors or cells requires only a small amount of code, described above as the tiles. Each of the fine grain processors has its own memory and also has access to a shared local memory which is shared among a group of cells. Each of the fine grain processors also has access to a global memory by which the cells can communicate among each other. Each of the fine grain processors functions in the same manner as the fine grain processors of an integrated VLSI microprocessor circuit.

As is apparent from the present description, other modifications and alternative implementations will occur to those versed in the art without departing from the true spirit and scope of the invention. Accordingly, it is not intended to limit the invention to what has been particularly shown and described except as indicated in the appended claims.

Set forth below is a glossary of terms, and Appendix A describing the tile-cell algorithm.

Further information on the system of this invention is provided in the document entitled Book of Paracell, Final Review Draft, 11 Nov. 88, of the assignee of this invention, a copy of which is enclosed with this application and the contents of which are incorporated herein by reference.

GLOSSARY active data—a programming style where new data are automatically processed without explicit subroutine calls. The present system is an active data machine—whenever new import data appears in global memory, new export data appears without explicit calls to tiles which generate the data.

binding—the process of selecting a tile from a tile group to be run in a cell during a particular frame. Cells in a group are bound to the cell and run on a round-robin basis. The term is also used in connection with rule interpreters to describe the process of establishing a value for a variable. In conventional expert systems, bindings refers to the process of assigning a value to a variable.

BIP—Bus Interface Processor. The BIP manages the interface to the global bus on behalf of a group of four user processors. There are four user processors and one BIP per processor board. The BIP manipulates global memory addresses and local memory addresses in the Exim list so that cells in user processors import and export appropriate data during each frame.

boss board—global bus control logic that schedules all accesses to the global bus and initiates data transfers between local and global memory. The order in which user processors are allocated bus cycles during a frame is stored in register on the boss board. The boss board also includes a parallel interface that shares some of global memory with the workstation.

cell—the minimum allocatable unit of hardware resources. A typical cell has 16 words of imports, 8 words of exports, and runs about 350 instructions during every frame.

cluster—a collection of tiles which are displayed as if they were a single tile. Clustering many tiles into one helps people understand programs, although it has no effect on execution.

conflict resolution—the process of choosing one rule to fire from a list of available rules. The system avoids conflict resolution by running all the rules during each frame. May also refer to the process of arriving at concensus during system design.

container—a square in the navigator pyramid which can store a tile, a tile cluster, or comments.

cycle—the act of a specific portion of the hardware completing an operation. The speed of a cycle depends on the hardware. For example, the global bus transfers a word between local and global memory every 40 nanoseconds, chips on global memory boards cycle every 200 nanoseconds, and so on.

dictionary—a list of names for Paracell variables. The dictionary is maintained by the workstation.

ExIm list—a list of pairs of global memory addresses and the data associated with the address stored in high-speed registers on each processor board. When a processor is granted a global bus cycle to transfer data between local and global memory, the global address and data are fetched from this list. The list is manipulated by the BIP so that all data needed by each tile is fetched before the tile starts processing.

expert system—a general term describing computer programs which do what experts do. Most expert systems are rule-based.

export—data computed by tiles and transferred to global memory at the end of each frame.

frame—a period of time during which every cell in every processor is given a chance to run any code tile which is bound to the cell. Each cell can import up to 16 words and export up to 8 words of global memory and can execute about 350 Motorola 68030 instructions per frame. The system normally cycles at 60 Hz, but can be set up to run at different rates.

global memory—a memory bank where Paracell and Parabase variables are stored. Variables are read from global memory at the beginning of a PIM frame, processed, and new values written back to global memory at the end of the frame.

group—a collection of tiles which are associated with a cell or cells. Tiles in a group are bound to the cell and run in a round-robin basis.

import—data read from global memory into local memory at the beginning of a frame.

inference—the process of deriving new facts from existing facts. For example, if it is known that humans are mortal and that Socrates is human, it can be inferred that Socrates is mortal.

local memory—banks of memory which are dedicated to local processors. Processors stored programs and intermediate data in local memory, transferring only final results to global memory.

navigator—a software tool which runs on the PIM workstation. The navigator provides a managerial view of the tile database. Users may associate tiles in the navigator display in any manner that makes sense for the project.

neuron—a single cell in a human brain. Neurons compute outputs based on weighted sums of their inputs. The PIM ExIm mechanism makes it extremely easy to build different kinds of neural networks.

PID—the abbreviation for Proportional Integration and Differentiation.

global bus—a very wide 40 nanosecond bus which transfers 32 bit words of data between global memory and the local memory of a user processor.

real-time—either fast enough that computer speed is not a problem or predictable such that interval between receiving input and generating appropriate output does not vary with the computer load. The PIM meets both of these definitions.

rule—a logical construct for inferring new facts on the basis of existing facts. Rules take the form of if <conditions> then <actions> else <alternate actions>. PIM rules are unique in that else clauses are permitted.

sequence—a set of tiles which must run in a specified order during a frame. Tiles in a sequence on the same processors may pass data to tiles later in the sequence without waiting for the next frame. The order of tiles in a sequence also determines the export priority of tiles which export to the same variable(s), "last write wins".

tile—the smallest unit a Paracell program which is managed by the software development tools. Tiles are stored in the tile database during development. All the tiles which are associated with a PIM cell are bound to the cell and run in a round-robin order.

tile database—a distributed set of workstation disk files in which code tiles are stored, sorted, and made available for user examination and editing.

tile template—a bare tile containing logic but no parameters. Users fill in templates to generate rules, neurons, coherent objects, and other tiles without having to remember the details of building such tiles.

user processor—one of a maximum of 120 Motorola 68030 microprocessors in the PIM. User processors do the work of computing results specified by code tiles.

APPENDIX A

Assignment of tiles to cells—algorithm

There exists a subset of all cells which are eligible for M grouping because of their position in the cell sequence; the first of these cells has imports for itself and M-1 additional subsequent cells available, and the last of these cells has exports for itself and M-1 previous cells available. These cells must also all reside on the same processor. We will refer to this subset as the M-group of cells.

first, assume no tile sequence ...
there are in the general case N tiles and M cells
there are four cases:
1) N=M=1 "basic tile"
   bind tile to an arbitrarily chosen cell indefinately; this arbitrary choice may be remade to enable other tile bindings to be feasible
2) M=1 "round-robin tile group"
   bind each of the N tiles to a single arbitrarily chosen cell, one tile is bound per frame in an arbitrary sequence this sequence is repeated indefinately the arbitrary cell choice may be remade to enable other tile bindings to be feasible
3) N=1 "multiple cell tile"
   bind the tile to an arbitrarily chosen member of the M-group of cells
   the arbitrary cell choice may be remade to enable other tile bindings to be feasible
4) N≠1 and M≠1, there are three subcases
4a) N≠M and the cells are not grouped
   an arbitrary M cells are chosen (usually on the same processor to reduce redundancy of tile code) the tiles are assigned an arbitrary order
   M of the N tiles are bound to the M cells on each frame, beginning with the N mod (M* frame number) tile, based on the arbitrary tile order the arbitrary cell choice may be remade to enable other tile bindings to be feasible
   note that if the greatest common divisor of M and N, gcd, is not 1, this case can be reduced to gcd smaller equivalent problems of N÷gcd, M÷gcd, and if M÷gcd is 1, this smaller problem is simply case 2.
4b) N≦M and the cells are not grouped
   this is a degenerate case; reclaim M-N cells perform case 1 N times for each pair of tile and cell.
4c) the cells are grouped
   perform case 3 N times.

What is claimed:

1. In a computer system having a plurality of processor cells each of which can contain a formula, a method comprising:
   writing a formula in each cell, the formula containing one or more variables;
   coupling each of the cells to a global memory;
   storing variable values in the global memory;
   importing, at the beginning of a frame, values for the variables into the cells from the global memory;
   exporting, at the end of a frame, new variable values computed by the cells using said imported values, from those cells to the global memory;
   defining a first level matrix of said cells;
   defining at least one other level matrix of said cells, this level matrix being contained in a cell of the first level; and
   defining a lowest level matrix of said cells each of which contains only code.

2. In a computer system having a plurality of processor cells for executing program statements, and having a global memory accessible by each cell, a method for updating the contents of the global memory in accordance with a plurality of the program statements, the method comprising the steps of:
   storing variable values in the global memory;
   partitioning a plurality of program statements into a plurality of tiles, each tile containing at least one program statement;
   distributing the plurality of tiles among the plurality of processor cells;
   importing, at the beginning of a frame, variable values into the processor cells from the global memory, wherein the processor cells can communicate with other processor cells only via the global memory;
   executing the tiles using the variable values to produce new variable values;
   exporting, at the end of the frame, the new variable values to the global memory;
   defining a first level matrix of said tiles; and
   defining at least one other level matrix of said tiles, this level matrix being accessible only via a tile of the first level.

3. A parallel processing system providing real-time logical inferencing, the system comprising:
   a plurality of processor cells each having a local memory for storing program data for its processors, and intermediate data resulting from the program executed by its processor;
   each of the processor cells operative to run a programmed formula, and each having its own instruction stream between local memory and the processor and its own data stream between the local memory and processor;
   a global memory means for storing final data from the processor cells and providing data to the processing cells;
   bus means coupling each of the processor cells to the global memory means for allowing access of all cells to the global memory means;
   each cell operative to import data from the global memory means and to export data to the global memory means, each processor cell having access to data from other cells only from the global memory means; and
   wherein the processor cells operate within a time frame, each of the processor cells processing within a different portion of the frame, wherein there are n cells each of which operate within 1/n portion of the frame.

4. A parallel processing system providing real-time logical inferencing, the system comprising:

a plurality of processor cells each having a local memory for storing program data for its processors and intermediate data resulting from the program executed by its processor;

each of the processor cells operative to run a programmed formula, and each having its own instruction stream between local memory and the processor and its own data stream between the local memory and processor;

a global memory means for storing final data from the processor cells and providing data to the processing cells;

bus means coupling each of the processor cells to the global memory means for allowing access of all cells to the global memory means;

each cell operative to import data from the global memory means and to export data to the global memory means, each processor cell having access to data from other cells only from the global memory means;

a cell group composed of one or more of the processor cells;

a tile group composed of one or more tiles, each of the tiles constituting a program for operation of a processor cell; and means for sequentially allocating each of the tiles of the tile group to selected cells of the cell group wherein the cell group runs the program code represented by the tiles.

5. The system of claim 4 wherein the cell group has fixed operating time frame;

and wherein each tile of the tile group has equitable allocation of a time slot within the operating time frame.

6. A parallel processing system providing real-time logical inferencing, the system comprising:

a plurality of processor cells each having a local memory for storing program data for its processors, and intermediate data resulting from the program executed by its processor;

each of the processor cells operative to run a programmed formula, and each having its own instruction stream between local memory and the processor and its own data stream between the local memory and processor;

a global memory means for storing final data from the processor cells and providing data to the processing cells;

bus means coupling each of the processor cells to the memory means for allowing access of all cells to the global memory means;

each cell operative to import data from the global memory means and to export data to the global memory means, each processor cell having access to data from other cells only from the global memory means;

a user interface providing user access to each of the processor cells; and a cell manager for graphic display of the contents all of the cells for visual access to each of the cells.

7. A parallel processing system providing real-time logical inferencing, the system comprising:

a plurality of processor cells each having a local memory for storing program data for its processors, and intermediate data resulting from the program executed by its processor;

each of the processor cells operative to run a programmed formula, and each having its own instruction stream between local memory and the processor and its own data stream between the local memory and processor;

a global memory means for storing final data from the processor cells and providing data to the processing cells;

bus means coupling each of the processor cells to the global memory means for allowing access of all cells to the global memory means;

each cell operative to import data from the global memory means and to export data to the global memory means, each processor cell having access to data from other cells only from the global memory means; and wherein the processor cells operate within a time frame, each of the processor cells processing within a different portion of the frame, wherein the processor cells operate in a specified order within the time frame;

and wherein the processor cells in one mode are operative to export data at the end of a frame;

and wherein the processor cells in another mode are operative to export data within a frame.

8. A multiprocessing system comprising:

one or more large grain microprocessor;

means for partitioning the microprocessors into a plurality of fine grain virtual processors each having its own memory;

a shared local memory coupled to a group of the virtual processors; and a global memory coupled to all of the virtual processors wherein each fine grain processor runs continuously and independently; and wherein each fine grain processor operates in accordance with a predetermined small grain program unit having a predetermined grain size and wherein each fine grain processor imports a predetermined amount of data at the beginning of a frame and exports a predetermined amount of data by the end of the frame, and wherein each fine grain processor is operative to communicate with the global memory during a predetermined time slot, and wherein each of the fine grain processors operate according to an if-then rule to produce a predetermined export in response to a predetermined import, and wherein each of the fine grain processors operates continuously to produce its export when the import condition is true, wherein the software means includes means for grouping a plurality of fine grain processors which cooperate to produce an export in response to a collective import condition which is true, thereby to process a complex rule composed of the rules of the plurality of fine grain processors.

9. A parallel processing system comprising:

a plurality of processor cells each having a local memory for storing program data for its processors, and intermediate data resulting from the program executed by its processor;

each of the processor cells operative to run a tile constituting a program for operation of the processor cell, and each having its own instruction stream between local memory and the processor and its own data stream between the local memory and processor;

a global memory means for storing final data from the processor cells and providing data to the processing cells;

bus means coupling each of the processor cells to the global memory means for allowing access of all cells to the global memory means;

each cell operative under control of its tile to import data from the global memory means and to export data to the global memory means, each processor cell having access to data from other cells only from the global memory means;

means for allocating each of a plurality of tiles to selected processor cells;

a memory list defining exports and imports for the processor cells; and wherein said means for allocating each tile to a cell includes means for assigning the priority of tiles when two or more tiles have export access to the same variable.

10. A parallel processing system comprising:

a plurality of processor cells each having a local memory for storing program data for its processors, and intermediate data resulting from the program executed by its processor;

each of the processor cells operative to run a tile constituting a program for operation of the processor cell, and each having its own instruction stream between local memory and the processor and its own data stream between the local memory and processor;

a global memory means for storing final data from the processor cells and providing data to the processing cells;

bus means coupling each of the processor cells to the global memory means for allowing access of all cells to the global memory means;

each cell operative under control of its tile to import data from the global memory means and to export data to the global memory means, each processor cell having access to data from other cells only from the global memory means;

means for allocating each of a plurality of tiles to selected processor cells; and wherein the means for allocating includes a memory list of exports and imports for the processor cells and ordered to define the sequence of tile operation.

11. A parallel processing system comprising:

a plurality of processor cells each having a local memory for storing program data for its processors, and intermediate data resulting from the program executed by its processor;

each of the processor cells operative to run a tile constituting a program for operation of the processor cell, and each having its own instruction stream between local memory and the processor and its own data stream between the local memory and processor;

a global memory means for storing final data from the processor cells and providing data to the processing cells;

bus means coupling each of the processor cells to the global memory means for allowing access of all cells to the global memory means;

each cell operative under control of its tile to import data from the global memory means and to export data to the global memory means, each processor cell having access to data from other cells only from the global memory means;

means for allocating each of a plurality of tiles to selected processor cells; and wherein the processor cells are each assigned to predetermined imports and exports.

12. A parallel processing system comprising:

a plurality of processor cells each having a local memory for storing program data for its processors, and intermediate data resulting from the program executed by its processor;

each of the processor cells operative to run a tile constituting a program for operation of the processor cell, and each having its own instruction stream between local memory and the processor and its own data stream between the local memory and processor;

a global memory means for storing final data from the processor cells and providing data to the processing cells;

bus means coupling each of the processor cells to the global memory means for allowing access of all cells to the global memory means;

each cell operative under control of its tile to import data from the global memory means and to export data to the global memory means, each processor cell having access to data from other cells only from the global memory means;

means for allocating each of a plurality of tiles to selected processor cells;

a processing unit composed of a plurality of processing cells;

means for causing the processor cells of a processing unit to run in a specified order in a specified time frame; and means for causing the processor cells of a processing unit to export data to one or more other cells at the end of the time frame and within the time frame.

* * * * *